United States Patent [19]

Kondo et al.

[11] Patent Number: 5,706,009
[45] Date of Patent: Jan. 6, 1998

[54] QUANTIZING APPARATUS AND QUANTIZING METHOD

[75] Inventors: Tetsujiro Kondo; Yasuhiro Fujimori; Kenji Takahashi; Kunio Kawaguchi, all of Kanagawa, Japan

[73] Assignee: Sony Corporation, Tokyo, Japan

[21] Appl. No.: 575,384

[22] Filed: Dec. 20, 1995

[30] Foreign Application Priority Data

Dec. 29, 1994 [JP] Japan .................. 6-338554
Jan. 20, 1995 [JP] Japan .................. 7-025904
Mar. 16, 1995 [JP] Japan .................. 7-084676
Mar. 28, 1995 [JP] Japan .................. 7-094496

[51] Int. Cl.[6] .............................. H03M 3/00
[52] U.S. Cl. ................................. 341/200
[58] Field of Search ........................ 341/200, 144, 341/155, 122, 123; 348/394, 539

[56] References Cited

U.S. PATENT DOCUMENTS 4,151,550  4/1979  Dinstein ........................ 358/13

*Primary Examiner*—Brian K. Young
*Attorney, Agent, or Firm*—William S. Frommer; Alvin Sinderbrand

[57] ABSTRACT

A difference signal generated in a prediction encoding process is block-segmented by a block segmenting circuit 2. Thus, the level distribution of the block-segmented difference signal is concentrated to a narrower portion than the level distribution of one entire screen. Reference values DR and MIN of each block of the difference signal are detected. A quantizing step width Δ and shift data ΔS are determined corresponding to such reference values and the number of quantizing bits N. A quantizing circuit 6 quantizes the difference signal with Δ. The difference signal is shifted and quantized so that the level 0 of the difference signal is obtained as 0 on the decoding side. A flag FLG and a that represent the quantized value of the level 0 are transmitted as side information along with the quantized value Q.

21 Claims, 19 Drawing Sheets

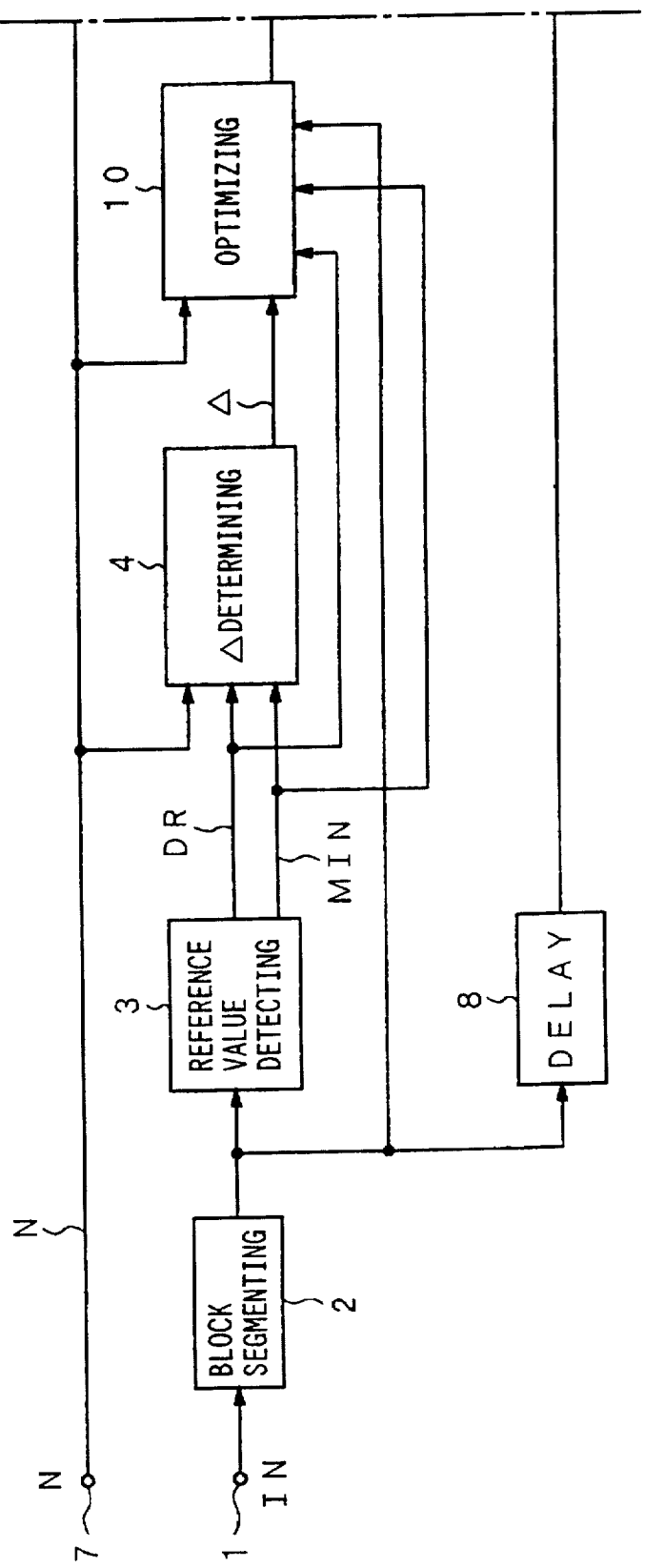

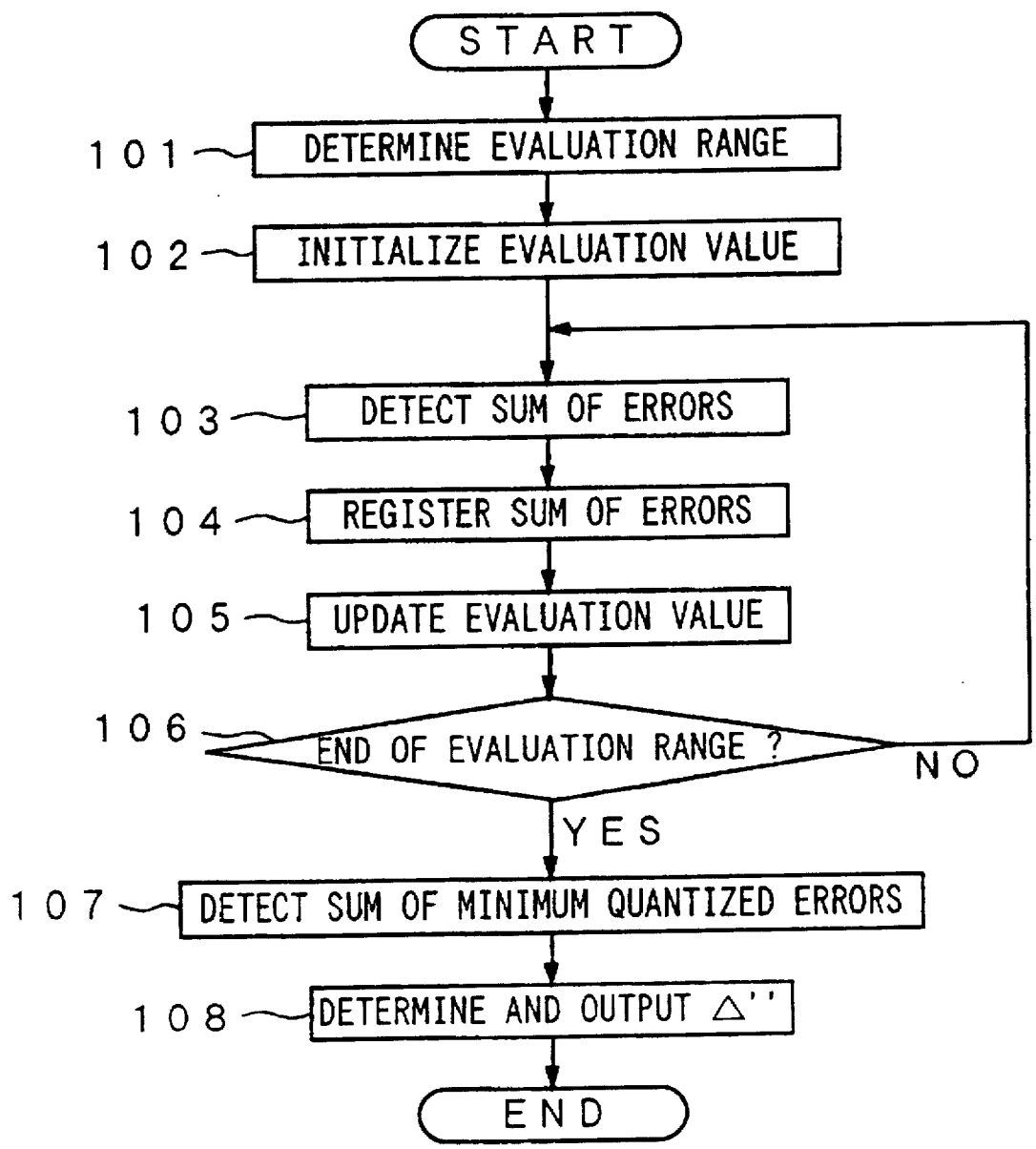

Fig. 15
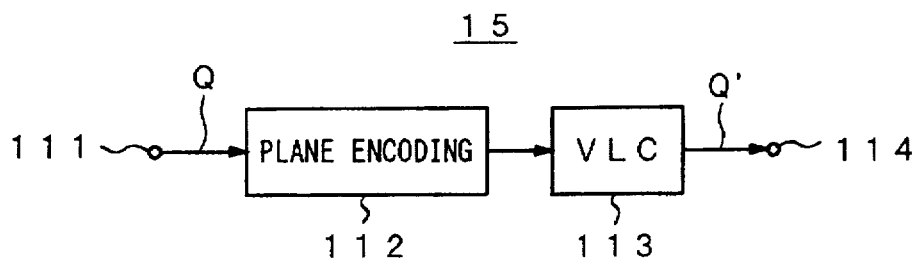
Fig. 16A    Fig. 16B
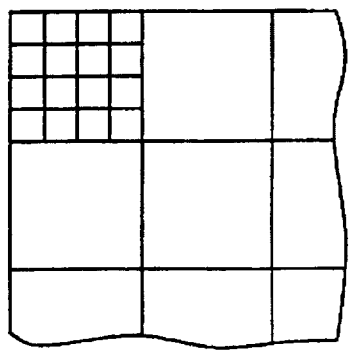    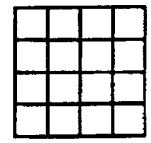
Fig. 16C    Fig.16D I
| 0 | 0 | 1 | 2 |
|---|---|---|---|
| 0 | 1 | 2 | 3 |
| 0 | 0 | 2 | 3 |
| 0 | 1 | 0 | 0 |
TWO-BIT QUANTIZED VALUE
| 0 | 0 | 0 | 1 |
|---|---|---|---|
| 0 | 0 | 1 | 1 |
| 0 | 0 | 1 | 1 |
| 0 | 0 | 0 | 0 |
MSB PLANE
| 0 | 0 | 1 | 0 |
|---|---|---|---|
| 0 | 1 | 0 | 1 |
| 0 | 0 | 0 | 1 |
| 0 | 1 | 0 | 0 |
LSB PLANE
Fig.16D II

FIFTH HIERARCHICAL LEVEL,
BLOCK SIZE (1/16×1/16)

FOURTH HIERARCHICAL LEVEL,
BLOCK SIZE (1/8×1/8)

THIRD HIERARCHICAL LEVEL,
BLOCK SIZE (1/4×1/4)

SECOND HIERARCHICAL LEVEL,
BLOCK SIZE (1/2×1/2)

FIRST HIERARCHICAL LEVEL,
BLOCK SIZE (1×1)

QUANTIZING APPARATUS AND QUANTIZING METHOD

BACKGROUND OF THE INVENTION

Field of the Invention

The present invention relates to a quantizing apparatus for transmitting or recording a television signal or the like and a quantizing method thereof.

[Detailed Description of the Invention]
Description of the Related Art

Next, two problems of prior art will be described.

First, a prediction encoding method for compressing the transmission information amount of a digital audio signal, a digital picture signal, and so forth is known. For example, in one-dimensional DPCM, the difference between an input sample value and a predicted value is formed in time direction. On the other hand, in two-dimensional DPCM, the difference between an input sample value and a predicted value is formed in spatial direction. Since a digital information signal has a correlation in time direction and in spatial direction, the difference concentrates on around 0. Thus, the difference signal can be quantized with the number of bits smaller than the number of quantizing bits. Consequently, the information amount can be reduced. In addition, when the variable length encoding process is performed using the characteristic of the concentration of the distribution of the difference signal, the information amount can be more reduced.

In a conventional quantizing apparatus that deals with the difference signal, the quantizing step width at around 0 is finely designated. As the level becomes large, the quantizing step width is coarsely designated. This quantizing apparatus is referred to as a non-linear quantizing apparatus. In the conventional quantizing apparatus including the non-linear quantizing apparatus, all possible levels of the difference signal are quantized. For example, when one sample (one pixel) of a digital picture signal is quantized with eight bits, the values of the difference signal range from −255 to +255. In the conventional quantizing apparatus, all the range is used for the quantizing process.

In the conventional quantizing apparatus, since all region of the difference signal that is generated is quantized, when the number of quantizing bits is decreased, the quantizing accuracy degrades. On the other hand, when the number of quantizing bits is increased, the data amount that is generated increases. Thus, when a signal is decoded, an audio signal and a picture signal cannot be obtained with a satisfactory quality.

Next, the second problem will be described.

Conventionally, pictures as television signals or the like are encoded and compressed so as to transmit and record them. FIG. 26 is a block diagram showing an adaptive dynamic range coding (ADRC) apparatus as an example of an encoding apparatus. Data of each block composed of eight pixels× eight lines (hereinafter referred to as an (8×8) block is supplied from an input terminal 251. The input data of the (8×8) block is supplied to a maximum value detecting circuit 252, a minimum value detecting circuit 256, and a subtraction device 258. The maximum value detecting circuit 252 detects the level of the maximum value MAX of the pixels of the (8×8) block. The detected maximum value MAX is supplied to a subtraction device 253. The minimum value detecting circuit 256 detects the level of the minimum value MIN of the pixels of the block. The detected minimum value MIN is supplied to the subtraction devices 253 and 258 and also obtained from an output terminal 257.

The subtraction device 253 subtracts the minimum value MIN from the maximum MAX and generates a dynamic range DR. The dynamic range DR is supplied to a step width calculating circuit 254 and also obtained from an output terminal 255. The step width calculating circuit 254 calculates a predetermined step width from the supplied dynamic range DR. The calculated step width is supplied to a quantizing circuit 259. The subtraction device 258 subtracts the minimum value MIN from the input data and normalizes the input data. The normalized value is supplied to the quantizing circuit 259. The quantizing circuit 259 quantizes the input data corresponding to the supplied step width. A quantized value q is supplied from the quantizing circuit 259 to an output terminal 260.

In the above-described conventional ADRC apparatus, when input data concentrates in a predetermined level (for example, the background such as the sky), if the representative value of the decoded input data is different from the predetermined level, a spatial offset distortion may take place. For example, if one of two adjacent blocks included in the background as the sky is dark (low luminance) such as a shadow, since the dynamic ranges of the two blocks largely differ, the difference in their representative values grow big. Thus, the boundary of the adjacent blocks becomes visible.

SUMMARY OF THE INVENTION

A first object of the present invention is to provide a quantizing apparatus for improving the restored accuracy and the quality of the restored signal that has been dequantized and a quantizing method thereof.

A second object of the present invention is to provide a quantizing apparatus for allowing a quantized value of 0 to be dequantized to 0 and for designating an optimum quantizing step width and a quantizing method thereof.

A third object of the present invention is to provide a quantizing apparatus for encoding input data in such a manner that pixels concentrated in a predetermined level are decoded in the same level and a quantizing method thereof.

The invention of one embodiment is a quantizing apparatus for quantizing a difference signal representing the difference between a sample value of an input digital signal and a predicted value, comprising: means for obtaining a difference value between one of representative values of which the difference signal is quantized and a most concentrated value of a signal value to be quantized; means for shifting a quantizing representative value corresponding to the difference value so that the signal to be quantized accords with a most concentrated value of the signal to be quantized; and means for performing a quantizing operation corresponding to the shifted representative value.

As the side information, a code corresponding to a reference value of each categorized signal to be quantized and data for defining a quantizing condition may be transmitted. Alternatively, as side information, a code corresponding to a reference value of each categorized signal to be quantized and data for defining a quantizing step width may be transmitted. As another alternative method, as side information, a code corresponding to a reference value of each categorized signal to be quantized and data for defining a signal distribution width may be transmitted.

When the concentration of the level distribution of the difference signal is improved, it is not necessary to quantize the difference signal in all the level range. Thus, when the quantizing step width is fixed, the number of quantizing output bits can be decreased and the dynamic range of the quantizing apparatus can be widened. On the other hand, when the number of quantizing bits is fixed, the quantizing step width can be finely designated and the quantizing noise can be reduced. Thus, a dequantized value can be obtained with a high quality.

The invention of another embodiment is a quantizer, comprising: level detecting means for forming a block composed of a plurality of spatially and/or temporally adjacent pixels and for detecting a particular level of which the pixels of the block are concentrated; compensation amount generating means for generating a compensation amount corresponding to the detected particular level; compensating means for compensating a reference value of the block with the compensation amount; normalizing means for normalizing the pixels of the block corresponding to the reference value; and means for quantizing the normalized pixels.

A predetermined level is detected from each block of input data. A compensation amount and a minimum value MIN are added so that the predetermined level becomes a representative value. The input data is normalized corresponding to a minimum value MIN' generated corresponding to the minimum value MIN. Corresponding to the minimum value MIN', the input data is normalized. The normalized input data is quantized. Thus, a dynamic range DR, minimum value MIN', and quantized value q are transmitted.

The above, and other, objects, features and advantage of the present invention will become readily apparent from the following detailed description thereof which is to be read in connection with the accompanying drawings.

BRIEF DESCRIPTION OF THE DRAWINGS

FIGS. 12A and 12B are block diagrams showing an optimizing quantizing apparatus according to an embodiment of the present invention;

FIG. 14 is a flow chart showing an example of an optimizing process according to an embodiment of the present invention.

FIG. 15 is a block diagram showing an example of a variable length code encoder according to the present invention;

FIGS. 16A to 16D are schematic diagrams for explaining a plane encoding process;

DETAILED DESCRIPTION OF THE PREFERRED EMBODIMENTS

Figure 1:
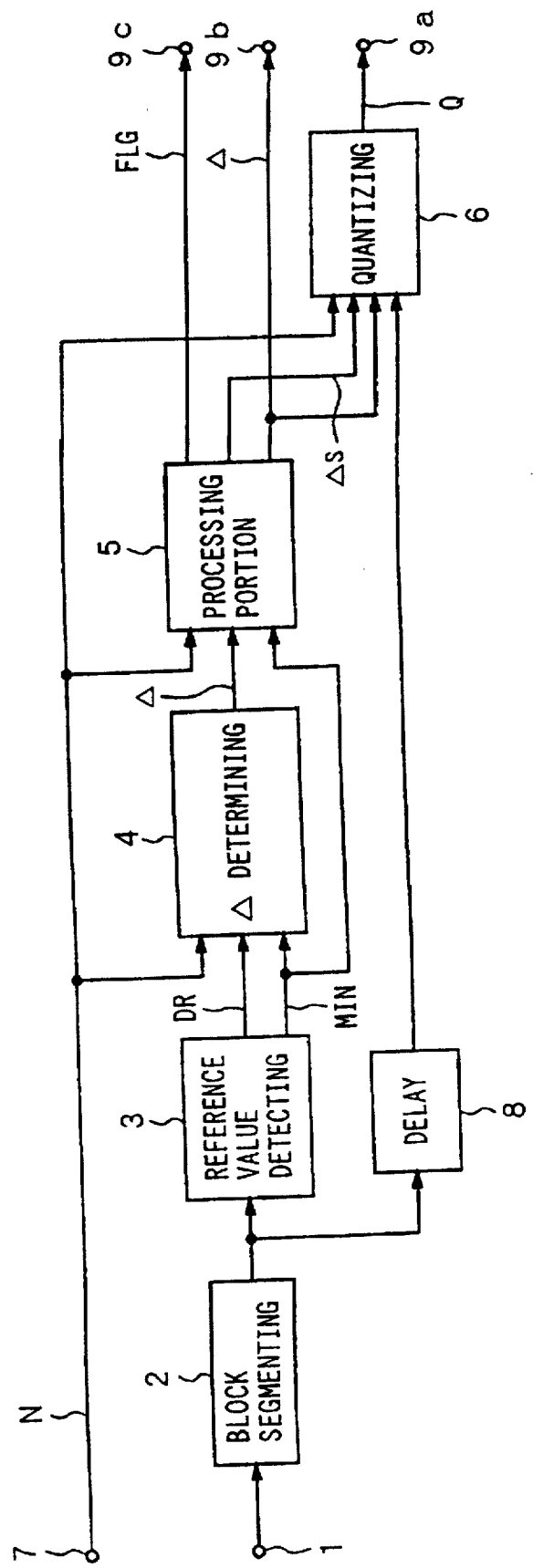
FIG. 1 is a block diagram showing a quantizing apparatus according to an embodiment of the present invention.
Figure 2A:
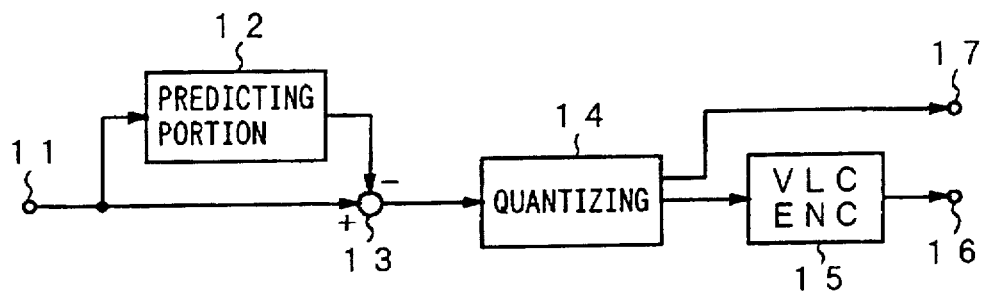
FIGS. 2A and 2B are block diagrams showing a prediction code encoder according to the present invention.
Figure 2B:
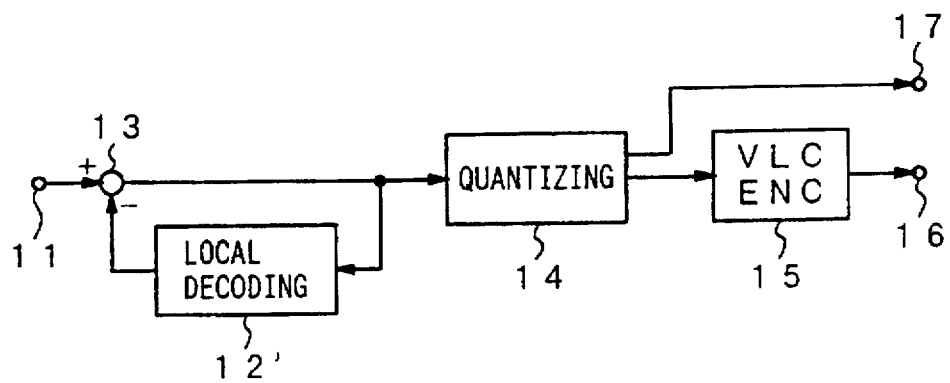

Next, with reference to the accompanying drawings, an embodiment of the present invention will be described. A difference signal is supplied to an input terminal 1 shown in FIG. 1. The difference signal is supplied to a block segmenting circuit 2. FIGS. 2A and 2B show an example of a prediction code encoder that generates the difference signal. In FIG. 2A, for example a digital picture signal is supplied to an input terminal 11. The digital picture signal is supplied to a predicting portion 12 and a subtraction device 13. The subtraction device 13 subtracts a predicted value generated by the predicting portion 12 from each pixel value and generates a difference signal as an output signal.

The difference signal is supplied to a quantizing portion 14. The quantizing portion 14 quantizes the difference signal with the number of quantizing bits smaller than the original number of quantizing bits. The present invention is applied for the quantizing portion 14 and an embodiment thereof is shown in FIG. 1. The quantizing portion 14 generates a quantized output (quantized value) and side information. The quantized value is supplied to a variable length code encoder 15. The side information is obtained from an output terminal 17. In reality, as shown in FIG. 2B, the output signal of the subtraction device 13 is supplied to a local decoding device 12'. A decoded output signal is supplied from the local decoding device 12' to the subtraction device 13.

Figure 3:
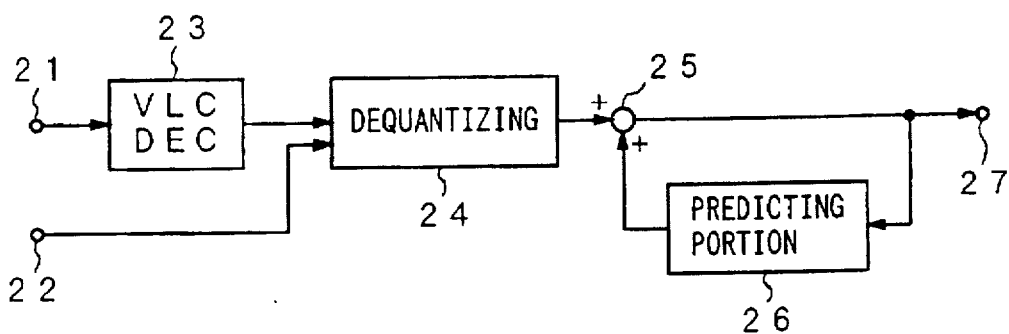
FIG. 3 is a block diagram showing a prediction code decoder according to the present invention.

FIG. 3 shows a decoder corresponding to the encoder shown in FIGS. 2A and 2B. A quantized value and side information are supplied to input terminals 21 and 22, respectively. The quantized value is decoded by a variable length code decoder 23. An output signal of the decoder 23 and the side information are supplied to a dequantizing portion 24. The dequantizing portion 24 dequantizes the quantized value to a dequantized value (representative value).

The dequantized value is supplied from the dequantizing portion 24 to an addition device 25. An output signal of the addition device 25 is supplied to an output terminal 27 and a predicting portion 26. The predicting portion 26 generates a predicted value and supplies it to the addition device 25. When a sample value for refreshing is periodically inserted for preventing errors of the encoder from being cumulated (refresh data is input), the addition device 25 supplies the dequantized value to the output terminal 27 without performing the addition.

Figure 4A:
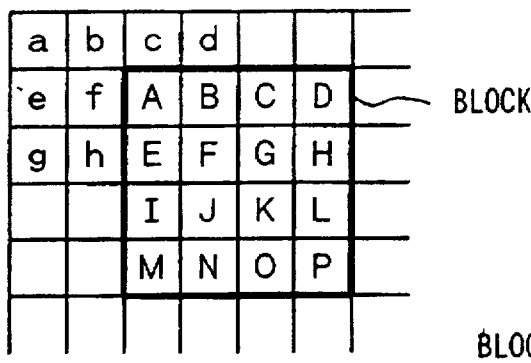
FIG. 4 is a schematic diagram for explaining an example of prediction encoding process.
Figure 4B:
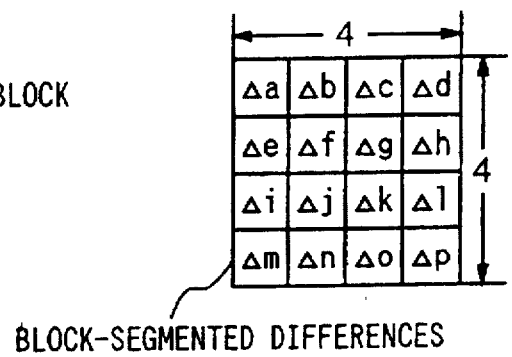

FIG. 4 shows a part of one screen for explaining an example of the prediction. In FIG. 4, a to h represent locally decoded pixel values. A to P represent pixel values that have not been encoded. A predicted value A' corresponding to the pixel value A is formed of adjacent locally-decoded pixel values. A predicated value of the pixel value A is formed of for example A'=4c–3(b–f), A'=f+c–d, and so forth. A predicted value of the pixel value B, C, . . . or the like is formed of a locally decoded value by the similar arithmetic operations.

For example, a predicted value (for example, A') is subtracted from a real pixel value (for example, A). (Namely, Δa=A–A' is calculated). Thus, the difference Δa is formed. As shown in FIG. 3, the block segmenting circuit 2 shown in FIG. 1 segments the difference into a block composed of (4×4) pixels. When a digital audio signal is handled, a predicate value is formed in time direction and thereby a block of a one-dimensional difference signal is formed.

As a method for improving the concentration of the difference signal, the difference signal is segmented into a block. The distribution of the occurrence frequency of the difference signal of one entire screen ranges from –255 to +255 with a center value of 0. When the difference is 0, the frequency is maximum. However, when the difference signal is segmented into a block, the level distribution of the difference is more concentrated than the original distribution. In the distribution of the difference of the block, the maximum frequency does not always accord with 0.

The difference of a smaller block than one screen tends to become a large value with a small probability. In addition, the correlation of the difference is strong in a block. When the level of the luminance gradually varies in for example a diagonal direction of the block, the maximum frequency does not accord with the difference 0. As described above, the block segmenting method is one example for improving the concentration of the level distribution of the difference signal. Thus, another method can be also used.

Next, returning to FIG. 1, an embodiment of the present invention will be described. As described above, a block segmenting circuit 2 supplies a block segmented difference signal to a reference value detecting circuit 3. The reference value detecting circuit 3 detects a maximum value MAX and a minimum value MIN of the level distribution of the block-segmented difference signal and calculates a dynamic range DR (=MAX–MIN). The detected reference values DR and MIN are supplied to a quantizing step width (Δ) determining circuit 4. As a reference value, the maximum value MAX may be detected.

The quantizing step width determining circuit 4 determines a quantizing step width Δ corresponding to the number of quantizing bits N received from an input terminal 7 and DR and MIN received from the detecting circuit 3. The quantizing step width Δ and the number of quantizing bits N are supplied to a processing portion 5.

When the processing portion 5 quantizes the difference signal corresponding to the quantizing step width Δ, it detects a quantized value that is the closest to the level 0 and outputs a flag FLG that is a code representing the quantized value to an output terminal 9c. To dequantize the quantized signal, information that defines the quantizing condition is required. In this example, the quantizing step width Δ is output to an output terminal 9b and transmitted. As the information defining the quantizing condition, the dynamic range DR may be transmitted. In this embodiment, both the encoder side and the decoder side know the number of quantizing bits N. However, if necessary, the number of quantizing bits N may be transmitted.

When the difference signal is 0, the dequantized value is preferably 0 so as to improve the performance. To do that, as shown in FIG. 10, shift data ΔS that represents the shift amount is formed so that the dequantized value accords with the level 0. Δ and FLG, which are output from the output terminals 9b and 9c, are side information.

The difference signal is supplied to a quantizing circuit 6 through a delay circuit 8. The number of quantizing bits N and the quantizing step width Δ and shift data ΔS generated by the processing portion 5 are supplied to the quantizing circuit 6. The quantizing circuit 6 quantizes the difference signal corresponding to the number of quantizing bits N, the quantizing step width Δ, and the shift data ΔS. A quantized value Q is obtained from an output terminal 9a of the quantizing circuit 6. The quantized value Q is variable-length encoded by a construction shown in FIGS. 2A and 2B.

Figure 5:
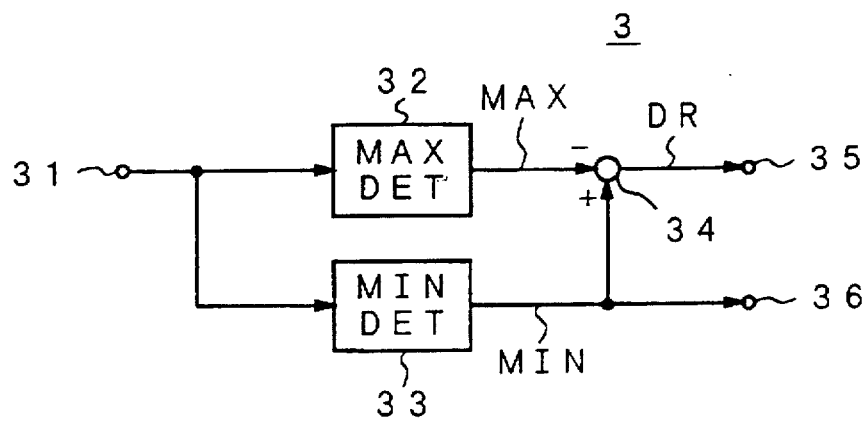
FIG. 5 is a block diagram showing an example of a reference value detecting circuit according to an embodiment of the present invention.

Next, each constructional element of the embodiment of the present invention will be described. FIG. 5 shows an example of the reference value detecting circuit 3. The block segmenting circuit 2 supplies a block-segmented difference signal to an input terminal 31. The difference signal is supplied to a maximum value detecting circuit 32 and a minimum value detecting circuit 33. Thus, a maximum value MAX and a minimum value MIN of the difference signal are supplied to a subtraction circuit 34. The subtraction circuit 34 obtains a dynamic range DR that is the distribution width of the difference signal. The dynamic range DR is obtained from an output terminal 35. The minimum value MIN is obtained from an output terminal 36.

In consideration of the later process, the maximum value detecting circuit 32 outputs 0 as the maximum value MAX when the maximum value is negative. In addition, the minimum value detecting circuit 33 detects 0 as the minimum value MIN when the minimum value is positive.

Figure 6:
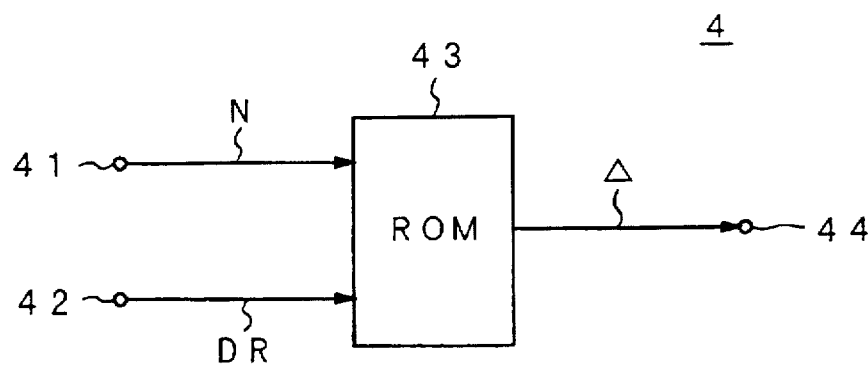
FIG. 6 is a block diagram showing an example of a quantizing step width determining circuit according to an embodiment of the present invention.

FIG. 6 shows an example of the quantizing step width determining circuit 4. The number of quantizing bits N and the dynamic range DR are supplied to input terminals 41 and 42, respectively. These input signals are supplied as addresses to a ROM 43. A table that generates the quantizing step width Δ has been written to the ROM 43. In other words, the quantizing step width Δ is determined corresponding to the following formula.

$$\Delta = DR/2^N \quad (1)$$

The quantizing step width Δ that is read from the ROM 43 is obtained from an output terminal 44.

Figure 7:
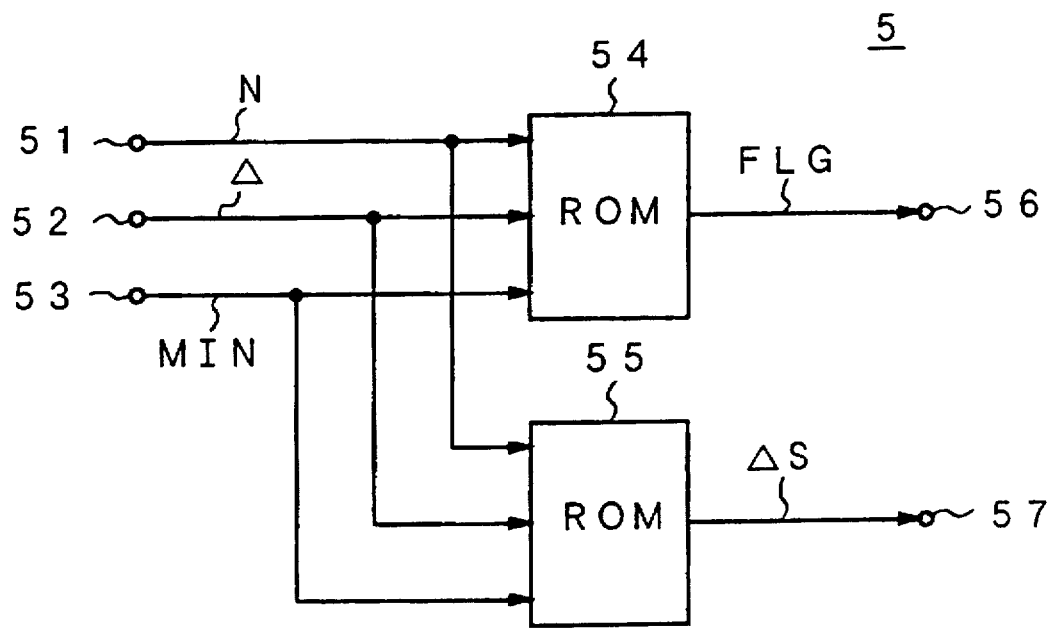
FIG. 7 is a block diagram showing an example of a processing portion according to an embodiment of the present invention.

FIG. 7 shows an example of the processing portion 5. The number of quantizing bits N, the quantizing step width Δ, and the minimum value MIN are supplied to input terminals 51, 52, and 53, respectively. These input data is supplied as address signals to ROMs 54 and 55. A flag FLG that represents a quantized value that is the closest to the level 0 of the difference signal is read from the ROM 54. Shift data ΔS is red from the ROM 55. These data is obtained from output terminals 56 and 57, respectively.

A formula that generates the flag FLG is given as follows.

$$FLG = [-MIN/\Delta]_{INT} \quad (2)$$

where $[\cdot]_{INT}$ represents an integer corresponding to "·". A table of FLG values generated corresponding to MIN values by the formula is stored in the ROM 54.

As shown in FIG. 7, the ROM 55 of the processing portion 5 generates the shift data ΔS. As represented by the following formulas, the shift data ΔZ for value to 0 is generated corresponding to the quantized value q.

$$q = [-MIN/\Delta]_{INT} \quad (3)$$

$$\Delta Z = (\tfrac{1}{2})\Delta + q \times \Delta + MIN + MIN \quad (4)$$

$$\Delta S = \Delta S + MIN \quad (5)$$

The table represented by these formulas is stored in the ROM 55.

Figure 8:
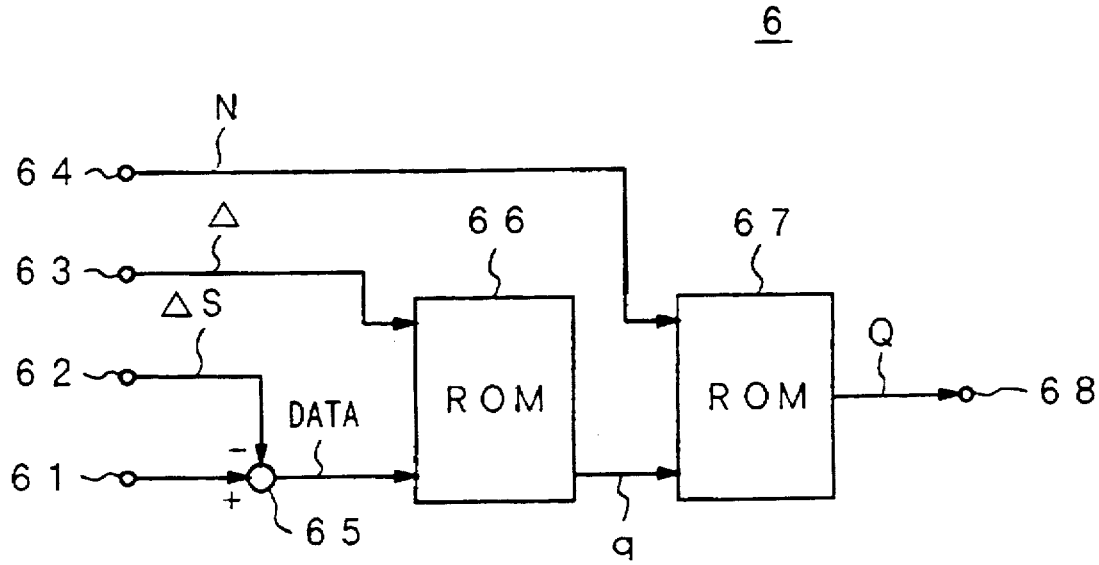
FIG. 8 is a block diagram showing an example of an quantizing device according to an embodiment of the present invention.

FIG. 8 shows an example of the construction of the quantizing circuit 6. The difference signal is supplied to an input terminal 61 through the delay circuit 8. The shift data ΔS, the quantizing step width Δ, and the number of quantizing bits N are supplied to input terminals 62, 63, and 64, respectively. The subtraction device 65 subtracts the shift data ΔS from the difference signal. Output data and the quantizing step width Δ are supplied to a ROM 66. A table equivalent to the division of the following formula (5) is stored in the ROM 66.

$$q = [data/\Delta]_{INT} \quad (6)$$

An output signal q of the ROM 66 is supplied as an address to a ROM 67. The ROM 67 performs a clip process that will be described later. A quantized value Q is supplied from the ROM 67 to an output terminal 68. As described above, since the processing portion 5 shifts the quantizing range for maintaining the level 0, the quantized value q of the formula (6) may overflow or underflow. To prevent that, the processing portion 5 should perform the clip process.

$$q = 2^N - 1 \text{ when } q > 2^N - 1$$

$$q = 0 \text{ when } q < 0 \quad (7)$$

Thus, the N-bit quantized value Q can be obtained.

Figure 9:
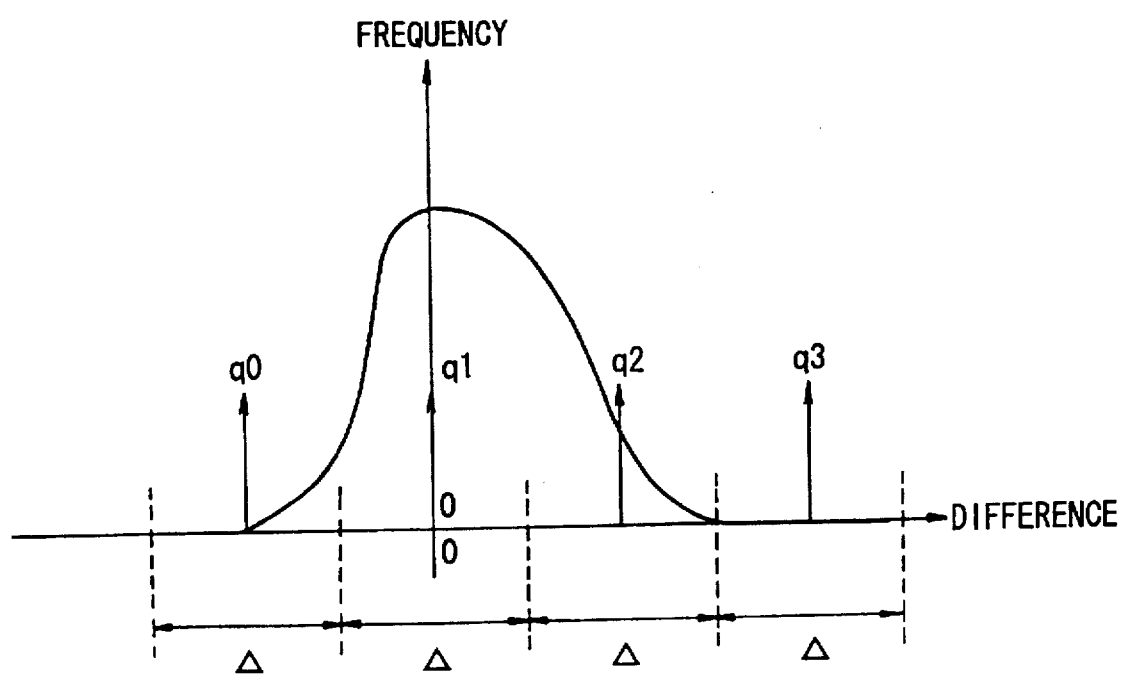
FIG. 9 is a schematic diagram for explaining a difference signal.

FIG. 9 shows the frequency distribution for an example of the difference signal of the signal to be quantized. As is clear from the example, a range has been designated to a region where the difference signal is not present. Thus, the quantizing step width Δ becomes large and thereby the quantizing error increases. Since the quantizing apparatus according to the present invention transmits a code that represents the position of a quantized value corresponding to a dequantized reference value as side information, the quantizing range (dynamic range) can be substantially increased with the number of quantizing bits that is the same as that of the conventional quantizing device.

For example, the case that a code that represents the position of 0 as a dequantizing reference value is transmitted as side information will be described. When the predicting error difference quantizing device performs the quantizing process for two bits, the position of 0 is represented with four types of codes (two bits) corresponding to the distribution of the signal to be quantized. Thus, the quantizing range is shifted corresponding to the distribution of the signal to be quantized. Consequently, the quantizing range (dynamic range) can be widened. In the predicting error difference quantizing device, it is very meaningful to restore 0 as a dequantized value. This is because if 0 is not restored as a dequantized value, a predicting error is accumulated and thereby a large picture deterioration takes place.

Figure 10A:
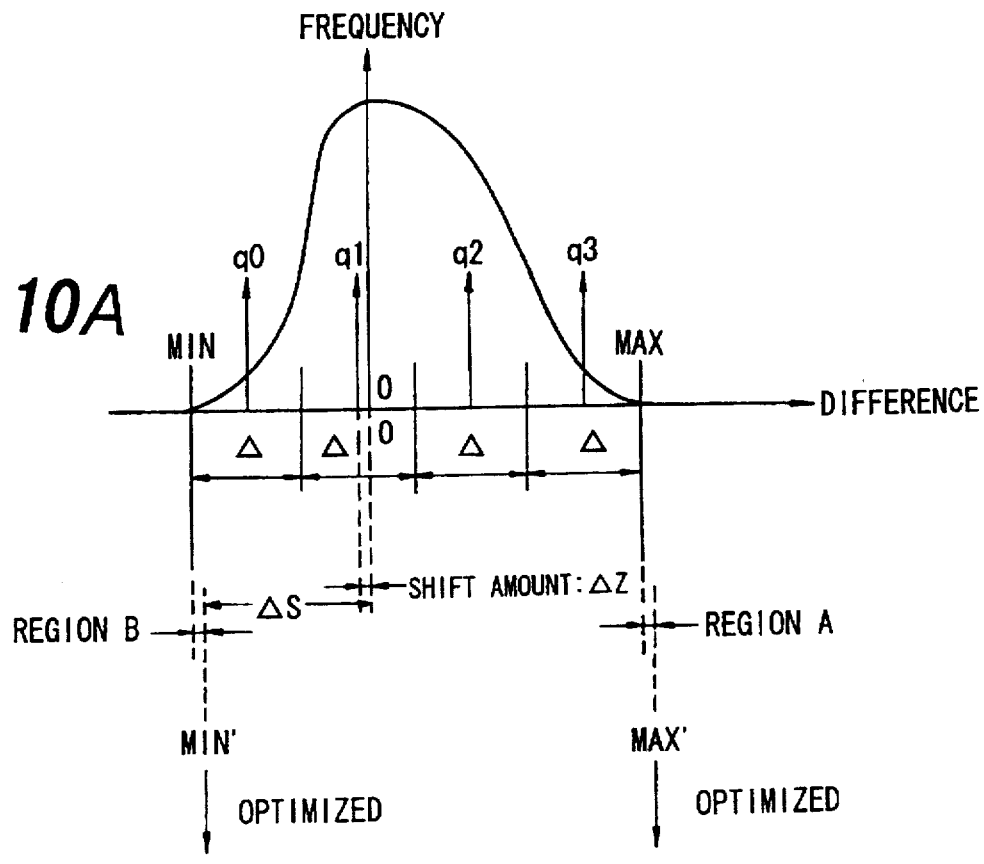
FIGS. 10A and 10B are schematic diagrams for explaining a quantizing process according to the present invention.
Figure 10B:
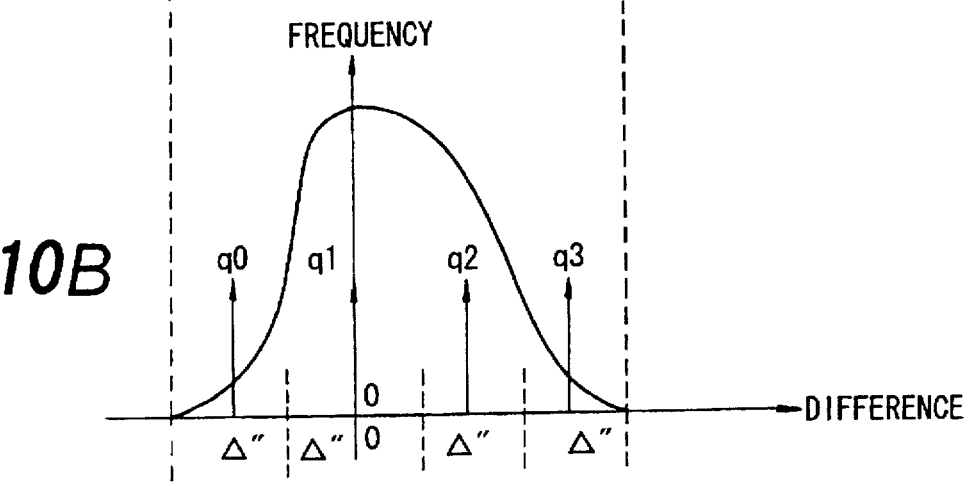

With the added code, the quantizing range (dynamic range) is widened. Thereafter, the quantizing range is shifted so that 0 is restored as a dequantized value. FIGS. 10A and 10B show the case that two-bit linear quantizing process is performed. When the difference signal shown in FIG. 10A is quantized, the maximum value MAX and the minimum value MIN of the signal distribution are detected and thereby the dynamic range thereof is determined. When the two-bit linear quantizing process is performed, the dynamic range is divided by four and thereby the quantizing step width Δ is obtained. Data corresponding to Δ is quantized in the range from 0 to 3. The dequantized values range from q0 to q3.

However, in this example, the dequantized value q1 that is closest to 0 is deviated in the minus direction for ΔZ. To cause the dequantized value q1 to be equal to 0, the quantizing range is shifted in the plus direction for ΔZ. Now, as shown in FIG. 10A, the maximum value and the minimum value of the quantizing range are denoted by MAX' and MIN', respectively. By the shifting process, the dequantized value q1 becomes 0. Thus, the predicting errors can be prevented from cumulating in the case that the dequantizing error is 0.

Figure 11:
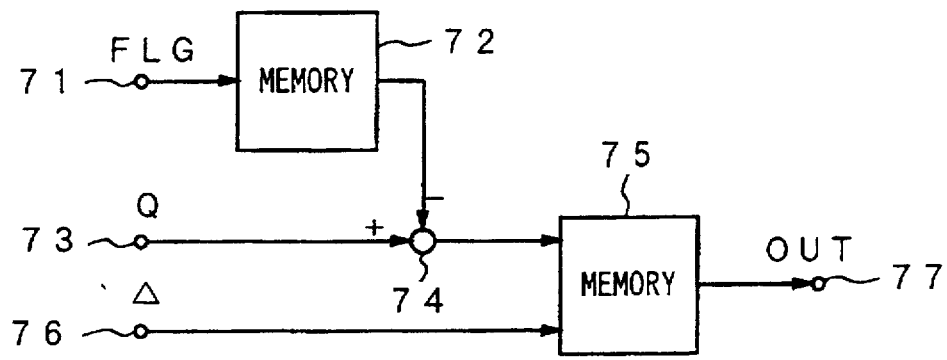
FIG. 11 is a block diagram showing an example of a decoding device of a quantizing apparatus according to an embodiment of the present invention.

FIG. 11 is a block diagram showing an example of the construction of which a dequantized value OUT is restored from the quantized value Q, the flag FLG, and the quantizing step width Δ generated by the quantizing apparatus shown in FIG. 1. The flag FLG corresponding to 0 is supplied from an input terminal 71 to a memory 72. When the encoding side has performed the process corresponding to the formula (2) for FLG, the memory 72 performs the inverse process of the process performed by the encoding side. A subtraction device 74 subtracts a value supplied from the memory 72 from the quantized value Q supplied through an input terminal 73. The subtraction result is supplied to a memory 75. The memory 75 performs an arithmetic operation given by the following formula (8).

$$OUT = (Q - FLG) \times \Delta \quad (8)$$

An arithmetic operation result OUT is transmitted from an output terminal 77.

A construction for optimizing the quantizing step width Δ according to another embodiment of the present invention will be described. The difference quantizing device according to the above-described embodiment shifts the quantizing range so as to cause the dequantized value to become 0 in the case that the input difference value is 0. In FIGS. 10A and 10B, the shifting process causes regions A and B to be generated at both ends of the quantizing range. The region A in FIG. 10A is equivalent to [MAX'−MAX]. However, according to the signal distribution shown in FIG. 10A, the signal to be quantized is not present in the region A. On the other hand, the region B is equivalent to [MIN'−MIN]. However, since the data in this region is shifted, it cannot be represented, but clipped. To prevent this problem, the quantizing step width a is optimized and a new quantizing step width Δ" is determined.

As shown in FIG. 10A, MAX' and MIN' are optimized so that the quantizing range is shifted by ΔS for the restoration to 0. To do that, there are following conditions.

(1) Restoration to 0
(2) Evaluation range of quantizing step width Δ

The condition (1) "restoration to 0" is an essential condition required for the quantizing device. Thus, for the optimized quantizing step width Δ" that is newly defined, the center value of the quantizing range becomes 0. An object of the condition (2) "evaluation range of quantizing step width Δ" is to take over the determination of the essential quantizing step width and to optimize the quantizing step width.

When the optimizing evaluation is performed for all the quantizing step width Δ, a problem may take place depending on an evaluation function for use. When the quantizing step width is evaluated in the dequantizing error range, some data may deviate from the quantizing range depending on the distribution of a signal to be quantized. Thus, the dequantized signal may disaccord with the visual characteristic. To prevent this problem, by restricting the evaluation region of the condition (2), the optimization is performed corresponding to the determining method of the essential quantizing step width Δ.

For example, in the distribution shown in FIG. 10A, with initial values of MAX', MIN', and Δ, the case that the minimum value of the quantizing range becomes equal to MIN is referred to as the maximum value of the evaluation values of the quantizing step width Δ. On the other hand, the case that the maximum value of the quantizing range becomes equal to MAX is referred to as the minimum value of the evaluation values of the quantizing step width Δ. In this range, the optimum quantizing step width is determined with the satisfaction of the condition (1). As an evaluation condition for the optimization, for example the sum of absolute values of dequantized errors may be used. By the above-described optimization, the quantizing step width Δ" shown in FIG. 10B is obtained.

Figure 12B:
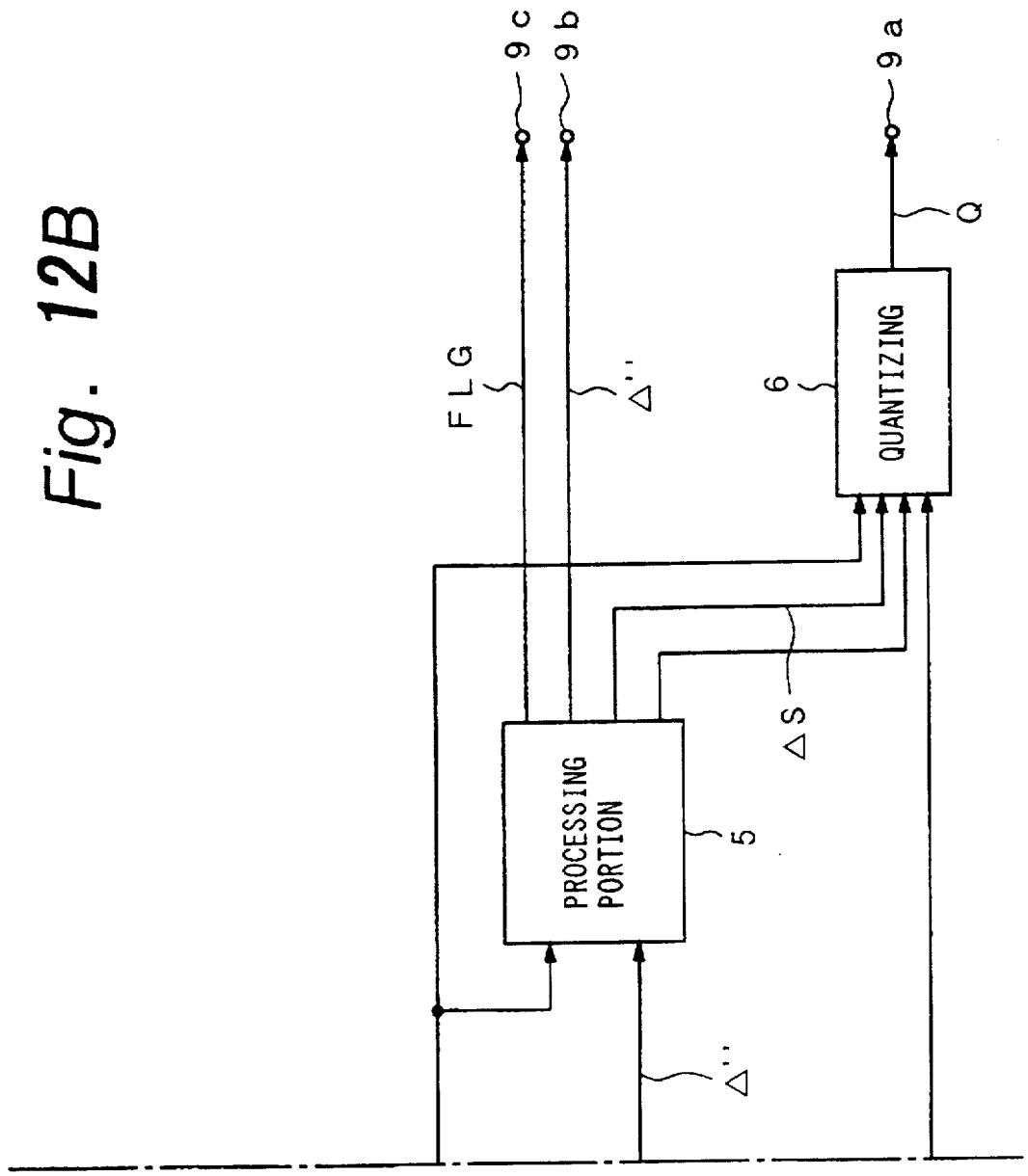

FIGS. 12A and 12B are block diagrams showing an example of the optimizing quantizing device. A difference signal is supplied to an input terminal 1. The difference signal is supplied to a block segmenting circuit 2. As described above, the block segmenting circuit 2 block-segments the difference signal and supplies the block-segmented signal to a reference value detecting circuit 3. The reference value detecting circuit 3 detects the maximum value MAX and the minimum value MIN of the level distribution of the block-segmented difference signal and calculates a dynamic range DR thereof (=MAX−MIN). The detected reference value DR and MIN are supplied to a quantizing step width (Δ) determining circuit 4. As a reference value, the maximum value MAX may be detected.

The quantizing step width determining circuit 4 determines a quantizing step width Δ corresponding to the number of quantizing bits N supplied from an input terminal 7 and DR and MIN supplied from the detecting circuit 3. An optimizing portion 10 generates an optimized quantizing step width Δ" corresponding to the number of quantizing bits N supplied from the input terminal 7, DR and MIN supplied from the detecting circuit 3, the difference signal supplied from the block segmenting circuit 2, and the quantizing step width Δ supplied from the quantizing step width determining circuit 4. The generated optimized quantizing step width Δ" is supplied to a processing portion 5 along with the number of quantizing bits N.

When the processing portion 5 quantizes the difference signal corresponding to the optimized quantizing step width Δ", it detects a quantized value of the level 0 and outputs a code that represents the quantized value as a flag FLG to an output terminal 9c. To dequantize the signal, information that defines quantizing conditions are required. In this example, the optimized quantizing step width Δ" is supplied to an output terminal 9b and transmitted. As information that defines the quantizing conditions, the dynamic range DR may be transmitted. In this embodiment, although both the encoder side and the decoder side know the number of quantizing bits N. However, if necessary, the number of quantizing bits N may be transmitted.

The difference signal is supplied to a quantizing circuit 6 through a delay circuit 8. In addition to the number of quantizing bits N, the optimized quantizing step width Δ" and the shift data ΔS generated by the processing portion 5 are supplied to the quantizing circuit 6. The quantizing circuit 6 quantizes the input signals. A quantized value Q is obtained from an output terminal 9a of the quantizing circuit 6. As shown in FIGS. 2A and 2B, the quantized value Q is variable-length-code encoded.

Figure 13:
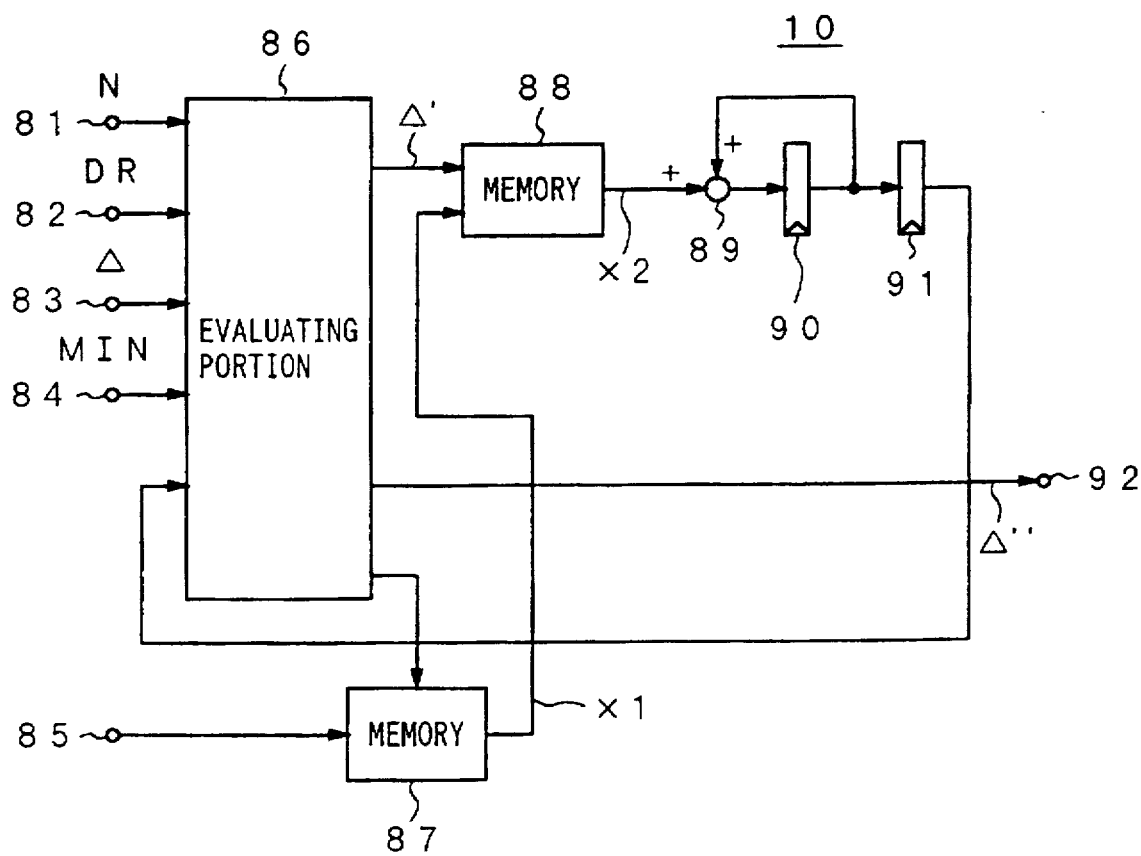
FIG. 13 is a block diagram showing an example of an optimizing portion according to an embodiment of the present invention.

FIG. 13 is a block diagram showing an example of the optimizing portion 10. N (the number of quantizing bits), DR, MIN, and Δ are supplied from an input terminal 81, an input terminal 82, an input terminal 83, and an input terminal 84 to an evaluating portion 86, respectively. A block-segmented signal evaluated in the evaluating portion 86 is supplied from an input terminal 85 to a memory 87. The evaluating portion 86 designates a quantizing step evaluation value Δ' with the satisfaction of the condition (1) "restoration to 0". The block-segmented signal stored in the memory 87 is supplied as data x1 to a memory 88 under the control of the evaluating portion 86. The memory 88 generates the absolute value of the quantized error corresponding to Δ' and data x1.

The memory 88 performs arithmetic operations given by the following formulas (9) and (10).

$$x2=|D-x1| \quad (9)$$

$$D=DEC(x1,\Delta) \quad (10)$$

where x1 is input data; x2 is the absolute value of the quantized error; and D is the dequantized value.

In addition, DEC (·) represents a function for generating a dequantized value. When the quantizing step width Δ is input, the quantizing range of each quantized value is automatically obtained from the condition (1) "restoration to 0". Thus, the dequantized value is automatically obtained. These processes are performed as a map of the memory 88. Since the arithmetic operation of the formula (9) can be performed in the memory 88, the memory 88 performs both the processes for the formulas (9) and (10). An addition device 89 adds data stored in the memory 88 and data stored in a register 90 and generates the sum of the absolute values of the quantized errors of the block-segmented signal and feeds back the result to the evaluating portion 86 through a register 91.

The sum of the absolute values of the quantized errors of the evaluation values of the quantizing step width Δ is stored in the evaluating portion. When the process for the evaluation values of the quantizing step width Δ is completed, the evaluating portion 86 determines an optimized quantizing step width Δ" corresponding to the minimum value. The determined optimized quantizing step width Δ" is transmitted from an output terminal 92. The process of the evaluating portion 86 can be accomplished by a logic circuit.

Alternatively, the optimized quantizing step width Δ" may be determined by a program using a CPU.

The processing portion 5 generates FLG and ΔS corresponding to the optimized quantizing step width Δ". The optimized quantizing step width Δ" is supplied from the input terminal 52 of the processing portion 5 shown in FIG. 7. Thus, FLG and ΔS are generated. On the other hand, the optimized quantizing step width Δ" is supplied from an input terminal 76 shown in FIG. 11 to the dequantizing device. The dequantizing device performs the above-described process so as to dequantize the input signal.

FIG. 14 shows an example of software flow chart for optimizing the quantizing step width. At step 101 "DETERMINE EVALUATION RANGE.", the evaluation range of the quantizing step width Δ is determined corresponding to the number of quantizing bits N, the minimum value MIN, and the dynamic range DR supplied to the optimizing portion 10. At step 102 "INITIALIZE EVALUATION VALUE.", an initial value of the evaluation value of the quantizing step width Δ is designated. At step 103 "DETECT SUM OF ERRORS.", an evaluation function value for the evaluation value of each optimizing quantizing step width Δ is detected. In this example, the sum of the absolute values of the dequantized errors of the signal is used as the evaluation function. At step 104 "REGISTER SUM OF ERRORS.", the evaluation value of each detected quantizing step width Δ is registered. At step 105 "UPDATE EVALUATION VALUE.", the evaluation value of the quantizing step width a is updated.

At step 106 "END OF EVALUATION RANGE", it is determined whether or not the evaluation range determined at step 101 "DETERMINE EVALUATION RANGE." is completed. When the evaluation range is completed, flow advances to step 107 "DETECT SUM OF MINIMUM QUANTIZED ERRORS.". When the evaluation range is not completed, flow advances to step 103 "DETECT SUM OF ERRORS.". At step 107 "DETECT SUM OF MINIMUM QUANTIZED ERRORS.", the quantizing step width Δ with the minimum sum of absolute values is detected. At step 108 "DETERMINE AND OUTPUT Δ"", the detected quantizing step width Δ is determined as the optimized quantizing step width Δ" and output. As a result, this flow chart is completed.

FIG. 15 shows an example of a variable length code encoder connected to the output terminal 9a shown in FIG. 1. As descried above, a quantized value Q is supplied from the quantizing circuit 6 to a plane encoding circuit 112 through an input terminal 111. As shown in FIG. 16C, the quantized value Q is represented by for example a two-bit code. After the different signal is block-segmented as shown in FIG. 16A, the two-bit quantized value is generated by the quantizing circuit 6 for each block (see FIG. 16B).

The plane encoding circuit 112 divides a two-bit quantized value into an MSB plane composed of MSBs (most significant bits) and an LSB plane composed of LSBs (least significant bits) as shown in FIG. 16D. The MSB plane is a set of MSBs of two-bit quantized values. The LSB plane is a set of LSBs of two-bit quantized values. A variable length code encoding circuit 113 performs a run-length encoding process (for example, MMR (modified MR)) for each bit plane being supplied. As a result, a plane quantized value Q' is obtained from an output terminal 114.

Figure 17:
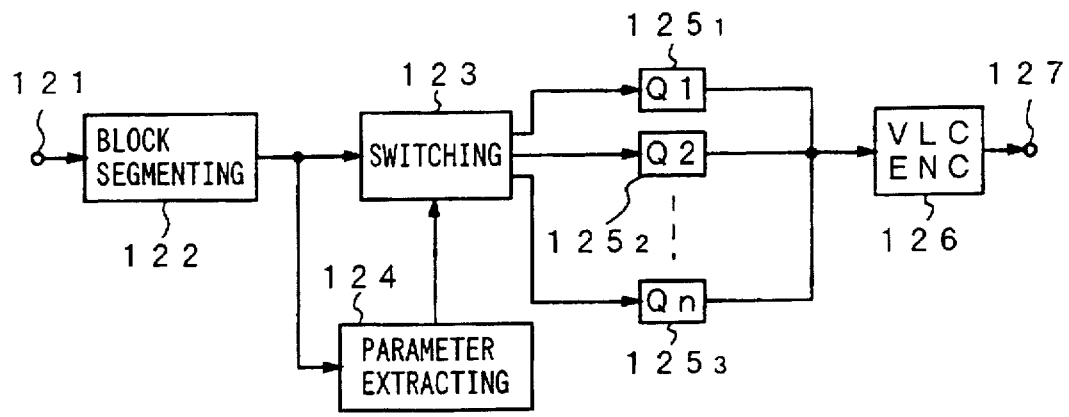
FIG. 17 is a block diagram showing a quantizing apparatus according to another embodiment of the present invention.

FIG. 17 is a block diagram showing another embodiment of the present invention. In this embodiment, quantizing devices are switched corresponding to a plurality of patterns (parameters) of level distribution of an input difference signal. As with the above-described embodiment, a difference signal is supplied to an input terminal 121. This signal is supplied to a block segmenting circuit 122. The block segmenting circuit 122 block-segments the difference signal. The block-segmented signal is supplied to a switching device 123 and a parameter extracting circuit 124. The parameter extracting circuit 124 generates a switching signal for switching the switching device 123 corresponding to the parameter of the difference signal.

The switching signal is supplied to the switching device 123. The switching device 123 selects one of quantizing devices $125_1$ to $125_n$ corresponding to the switching signal. A quantized value is generated corresponding to the quantizing characteristic of the selected quantizing device. The quantized value is supplied to a variable length code encoder 126. The variable length code encoder 126 performs a variable length code encoding process such as a run-length encoding process for the quantized value. The resultant quantized value is obtained from an output terminal 127.

Figure 18A:
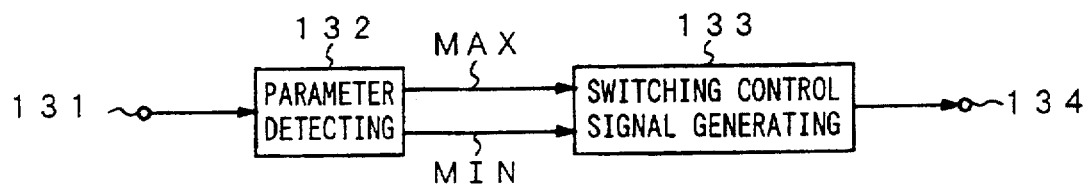
FIGS. 18A to 18D are block diagrams showing an example of a parameter detecting circuit according to an embodiment of the present invention.

FIG. 18A shows an example of the construction of the parameter extracting circuit 124. A block-segmented difference signal is supplied from the block segmenting circuit 122 to an input terminal 131. The maximum value MAX and the minimum value MIN of one block of the difference signal are detected by a parameter detecting circuit 132. The detected maximum value MAX and the minimum value MIN are supplied to a switching signal generating circuit 133. In this example, the switching signal generating circuit 133 outputs the switching signal for switching quantizing devices with three characteristics shown in FIGS. 18B, 18C, and 18D to an output terminal 134.

Figure 18B:
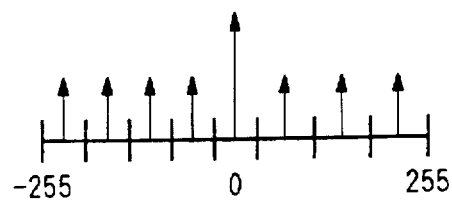
Figure 18C:
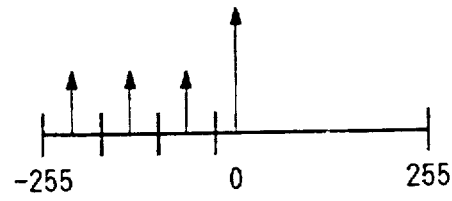
Figure 18D:
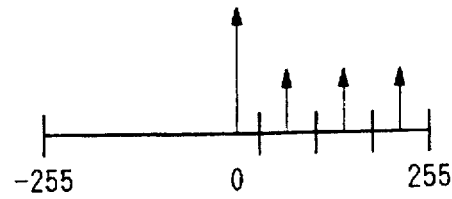

When the maximum value MAX of each block of the difference signal is greater than 0 and the minimum value MIN thereof is smaller than 0, a quantizing device with the characteristic shown in FIG. 18B is selected with the switching signal. When the maximum value MAX is smaller than 0, a quantizing device with the characteristic shown in FIG. 18C is selected. When the minimum value MIN is greater than 0, a quantizing device with the characteristic shown in FIG. 18D is selected.

Figure 19A:
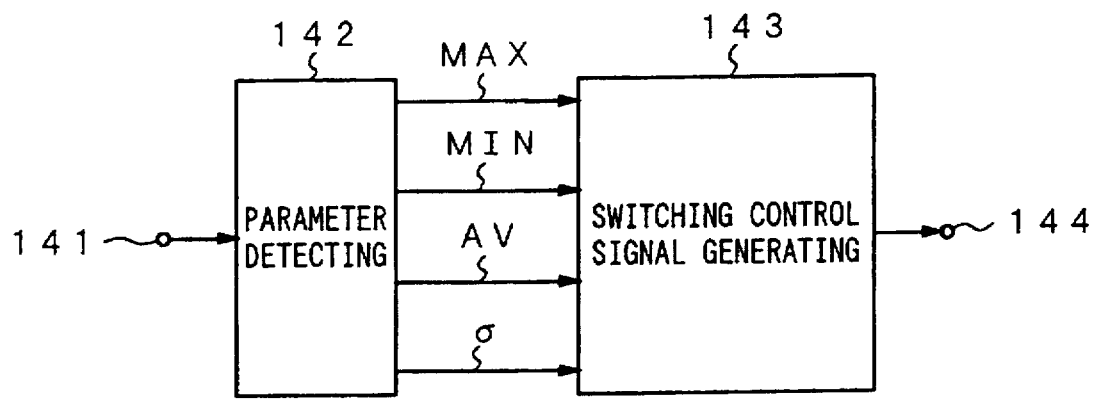
FIGS. 19A to 19C are block diagrams showing another example of the parameter detecting circuit according to the present invention.
Figure 19B:
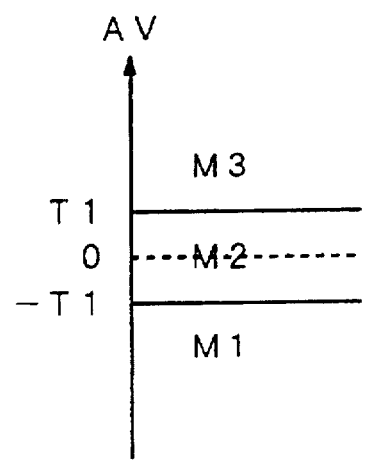
Figure 19C:
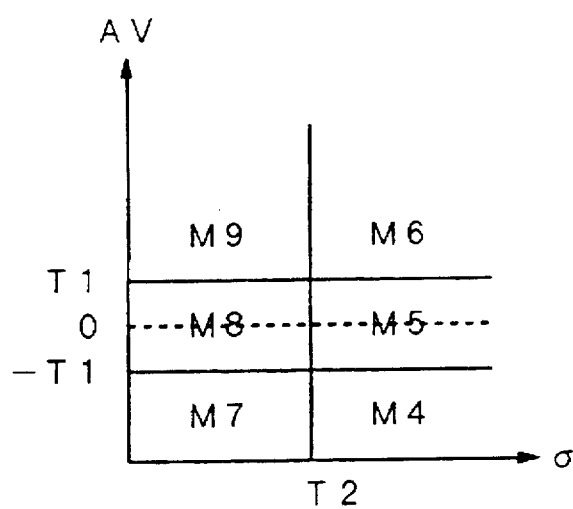

FIG. 19A shows another example of the parameter extracting circuit 124. A block-segmented difference signal is supplied to a parameter detecting circuit 142 through an input terminal 141. The parameter detecting circuit 142 detects a maximum value MAX, a minimum value MIN, an average value AV, and a standard deviation σ of the block-segmented difference signal and supplies them to a switching signal generating circuit 143. In this example, as shown in FIGS. 19B and 19C, the switching signal generating circuit 143 generates a switching signal for switching a plurality of quantizing devices with respective characteristics. The switching signal is obtained from an output terminal 144.

As shown in FIG. 19B, corresponding to the results of the comparisons of the average value AV of one block of the difference signal, the threshold values T1 and −T1, the following selections are performed.

When AV≦−T1, a quantizing device M1 is selected.
When −T1≦AV≦T1, a quantizing device M2 is selected.
When T1≦AV, a quantizing device M3 is selected.

It is assumed that these three quantizing devices properly perform quantizing processes corresponding to respective situations. With respect to the average value AV, when AV≧T1 and AV≦−T1, since the level distribution of the difference signal deviates on the + side or − side, the non-linear quantizing process of which the + side quantizing characteristic is different from the − side quantizing characteristic is performed.

In FIG. 19C, corresponding to the results of the comparisons of the standard deviation σ, the threshold values T1 and −T1, and the above-described average value AV, the following selections are performed.

When σ≧T2 and AV≦−T1, a quantizing device M4 is selected.

When σ≧T2 and −T1≦AV≦T1, a quantizing device M5 is selected.

When σ≧T2 and T1≦AV, a quantizing device M6 is selected.

When σ≦T2 and AV≦−T1, a quantizing device M7 is selected.

When σ≦t2 and −T1≦AV≦T1, a quantizing device M8 is selected.

When σ≦T2 and T1≦AV, a quantizing device M9 is selected.

The present invention can be applied for a quantizing apparatus for a hierarchical code encoder that will be descried later as well as the prediction code encoder shown in FIGS. 2A and 2B. In the following hierarchical encoding apparatus, predications are performed between hierarchical levels. By using simple arithmetic expressions for the hierarchical data, the number of pixels to be encoded can be prevented from increasing.

Figure 20:
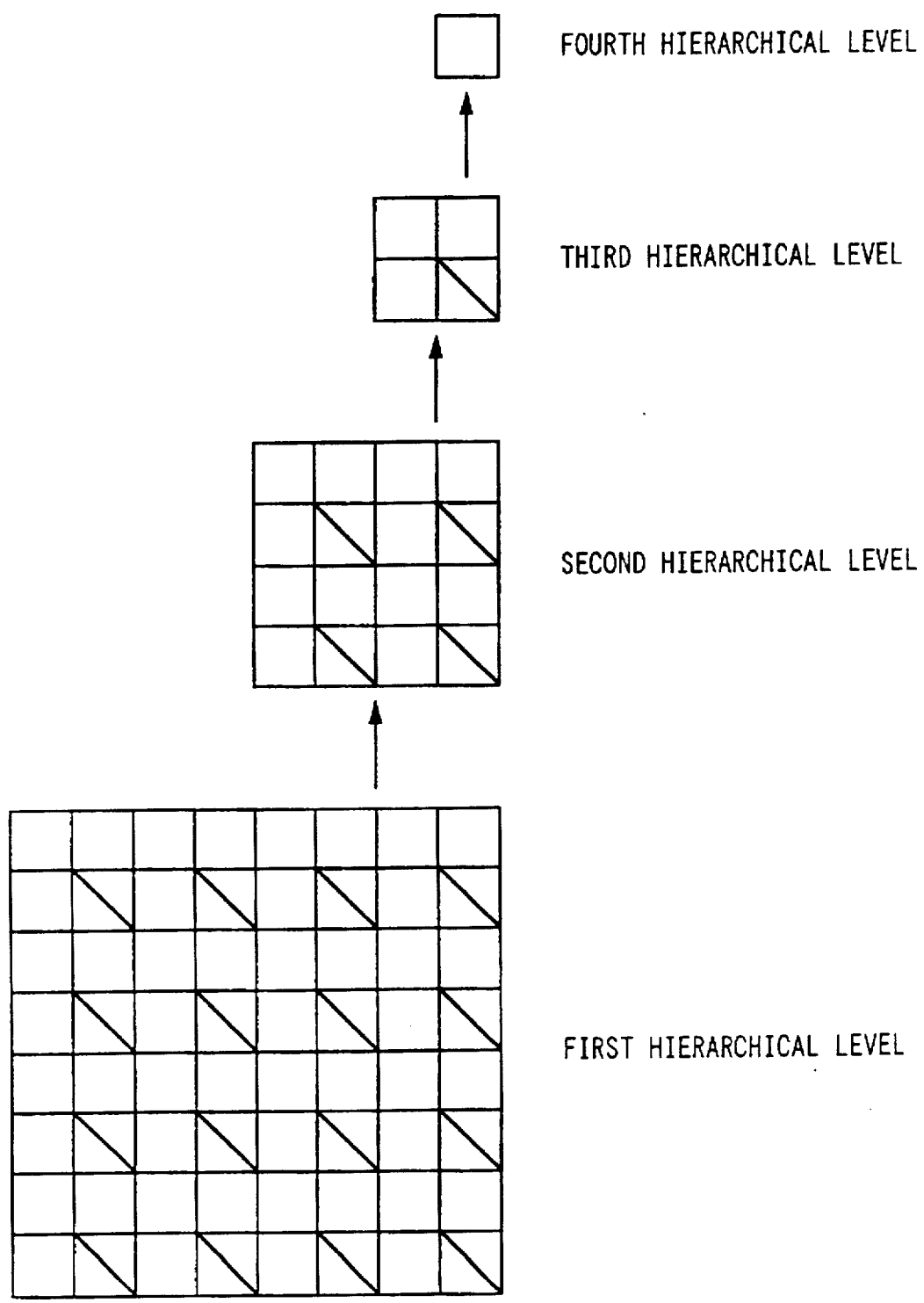
FIG. 20 is a schematic diagram for explaining an example of a hierarchical encoding process according to the present invention.
Figure 21A:
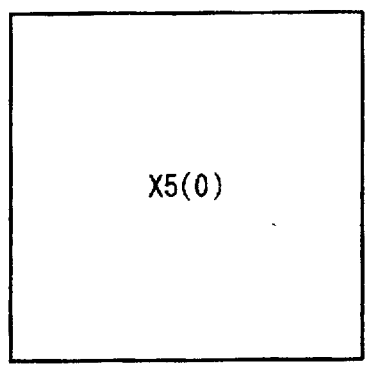
FIG. 21 is a schematic diagram for explaining an example of the hierarchical encoding process.
Figure 21B:
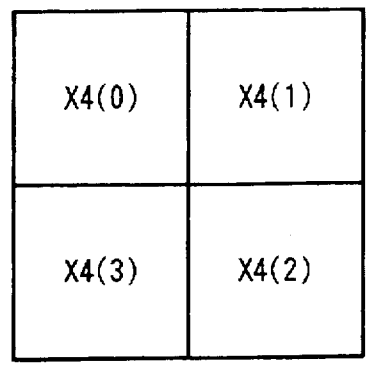
Figure 21C:
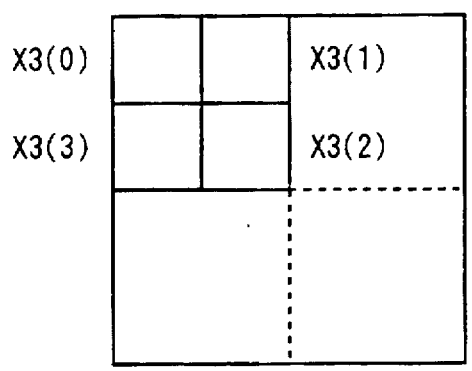
Figure 21D:
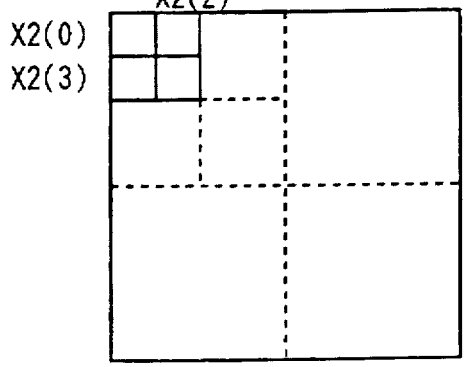
Figure 21E:
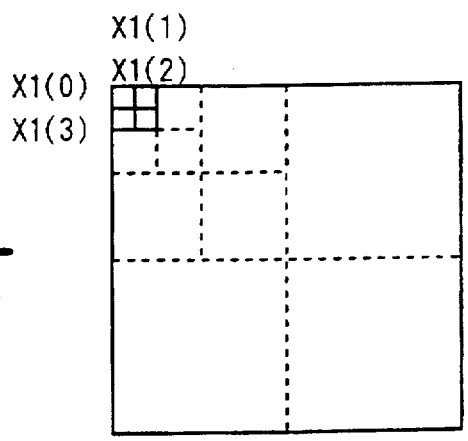

Next, with reference to FIG. 20, the hierarchical encoding method will be described. FIG. 20 is a schematic diagram showing that the first hierarchical level is the lowest hierarchical level (original picture) and the fourth hierarchical level is the highest hierarchical level. For example, as a higher hierarchical level data generating method, when an averaging method for averaging four spatially corresponding pixels in a lower hierarchical level is used, assuming that the higher hierarchical data is denoted by M and the lower hierarchical pixel values are denoted by $x_0$, $x_1$, $x_2$, and $x_3$, the number of pixels to be transmitted is still 4, not increases.

In other words, using M, $X_0$, $X_1$, and $X_2$, the not-transmitted pixel $x_3$ can be easily restored by the following simple arithmetic expression.

$$X_3 = 4 \cdot M - (X_0 + X_1 + X_2) \tag{11}$$

Each hierarchical data is generated by averaging the four pixels in the lower hierarchical level. Thus, even if data of the hatched portions in the drawing, all data can be restored corresponding to the formula (11).

FIG. 21 shows an example of the structure of five hierarchical levels of hierarchical data formed by the averaging method. It is assumed that the first hierarchical level is the level with the resolution of the input picture. In the first hierarchical level, data is composed in a block size (1×1). In the second hierarchical level, data is composed by averaging four pixels in the first hierarchical level. In this example, data $X_2(0)$ in the second hierarchical level is generated by the average value of data $X_1(0)$ to $X_1(3)$ in the first hierarchical level. Data $X_2(1)$ to $X_2(3)$ adjacent to $X_2(0)$ in the second hierarchical level are generated by averaging respective four pixels in the first hierarchical level. In the second hierarchical level, data is composed in a block size (½×½). Data in the third hierarchical level is generated by averaging spatially corresponding four pixels in the second hierarchical level. Likewise, data the third hierarchical level is composed in block size (¼×¼). Likewise, data in the fourth hierarchical level is controlled corresponding to data in the third hierarchical level. Data in the third hierarchical level is composed in a block size (⅛×⅛). Data $X_5(0)$ in the fifth hierarchical level, which is the highest hierarchical level, is generated by averaging data $X_4(0)$ to $X_4(3)$ in the fourth hierarchical level. Data in the fifth hierarchical is composed in a block size (1/16×1/16).

Figure 22:
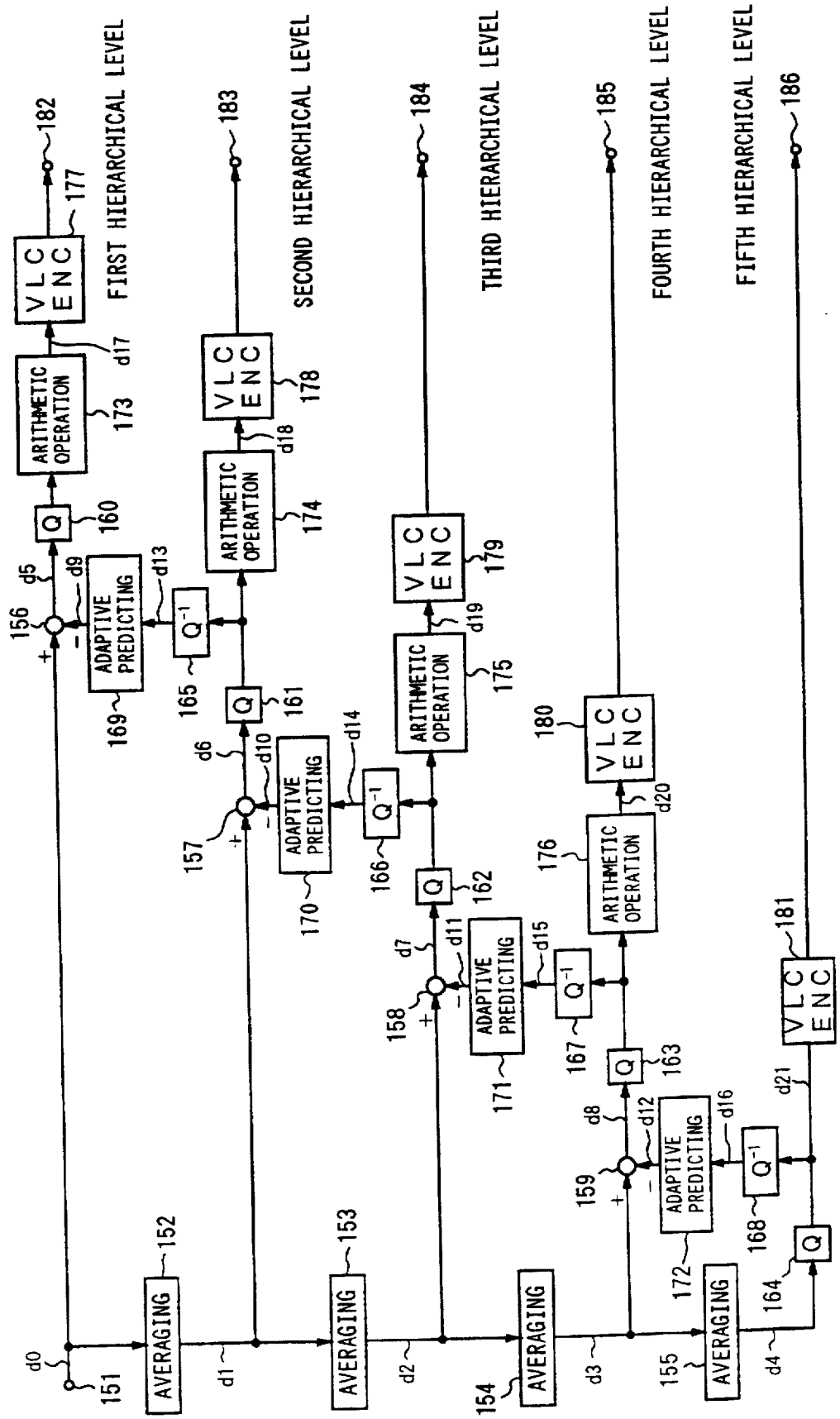
FIG. 22 is a block diagram showing an example of the construction of an encode side of the hierarchical encoding process.

By applying a class categorizing adaptive predicting process for data in a higher hierarchical level, data in a lower hierarchical level can be predicted. By generating the difference between the data in the lower hierarchical level and the predicted value (namely, the difference signal), the signal power can be reduced. Next, an example of the construction for reducing the signal power will be described with reference to a block diagram shown in FIG. 22. FIG. 22 shows an example of the construction of the hierarchical code encoder. Data d0 in the-first hierarchical level is supplied as input picture data d0 to an averaging circuit 152 and a subtraction device 156 through an input terminal 151. The data in the first hierarchical level is picture data with the original resolution.

The averaging circuit 152 performs a ¼ averaging process of a (2 pixels×2 pixels) block shown in FIG. 21 for the input pixel data d0 and generates hierarchical data d1. The hierarchical data d1 accords with data in the second hierarchical level shown in FIG. 21. The hierarchical data d1 is supplied to an averaging circuit 153 and a subtraction device 157.

The averaging circuit 153 performs the same process as the averaging circuit 152 for the hierarchical data d1. The hierarchical data d2 accords with data in the third hierarchical level. The generated hierarchical data d2 is supplied to an averaging circuit 154 and a subtraction device 158. The averaging circuit 154 performs the same process as the averaging circuits 152 and 153 for the hierarchical data d2 and generates the hierarchical data d3. The hierarchical data d3 accords with data in the fourth hierarchical level. The generated hierarchical data d3 is supplied to an averaging circuit 155 and a subtraction device 159. The averaging circuit 155 performs the same process as the averaging circuits 152, 153, and 154 for the hierarchical data d3 and generates the hierarchical data d4. The hierarchical data d4 accords with data in the fifth hierarchical level. The generated hierarchical data d4 is supplied to a quantizing device 164.

Data in five hierarchical levels is predicted between each hierarchical level. In the fifth hierarchical level, the quantizing device 164 performs the quantizing process for compressing data. Output data d21 of the quantizing device 164 is supplied to a variable length code encoder 181 and a dequantizing device 168. Output data of the encoder 181 is obtained as data in the fifth hierarchical level from an output terminal 186. Output data d16 of the dequantizing device 168 is supplied to a class categorizing adaptive predicting circuit 172.

The class categorizing adaptive predicting circuit 172 performs the predicting process for the data d16 and generates a predicted value d12 of the data in the fourth hierarchical level. The predicted value d12 is supplied to a subtraction device 159. The subtraction device 159 obtains the difference between the hierarchical data d3 supplied from the averaging circuit 154 and the predicted value d12 and supplies a difference value d8 to a quantizing device 163.

The quantizing device 163 performs the same compressing process as the quantizing device 164. Output data of the quantizing device 163 is supplied to an arithmetic operation device 176 and a dequantizing device 167. The arithmetic operation device 176 thins out one pixel from four pixels. Data d20 is output from the arithmetic operation device 176 and supplied to a variable length code encoder 180. Output data of the variable length code encoder 180 is obtained as data in the fourth hierarchical level from an output terminal 185.

Output data d15 of the dequantizing device 167 is supplied to a class categorizing adaptive predicting circuit 171. The class categorizing adaptive predicting circuit 171 performs the predicting process for the data d15 and generates a predicted value d11 of the data in the third hierarchical level. The predicted data d11 is supplied to the subtraction device 158. The Subtraction device 158 obtains the difference between the data d2 supplied from the averaging circuit 153 and the predicted value d11 and supplies a difference value d7 to a quantizing device 162.

Output data of the quantizing device 162 is supplied to an arithmetic operation device 175 and a dequantizing device 166. The arithmetic operation device 175 thins out one pixel from fourth pixels. Data d19 in the third hierarchical level is output from the arithmetic operation device 175 and supplied to a variable length code encoder 179. Output data of the variable length code encoder 179 is obtained as data in the third hierarchical level from an output terminal 184.

Output data d14 of the dequantizing device 166 is supplied to a class categorizing adaptive predicting circuit 170. The class categorizing adaptive predicting circuit 170 performs the predicting process for the data d14 and generates a predicted value d10 of data in the second hierarchical level. The predicted value d10 is supplied to the subtraction device 157. The subtraction device 157 obtains the difference between the data d1 supplied from the averaging circuit 152 and the predicted value d10 and supplies a difference value d6 to a quantizing device 161.

Output data of the quantizing device 161 is supplied to an arithmetic operation device 174 and a dequantizing device 175. The arithmetic operation device 174 thins out one pixel from four pixels. Data d18 in the second hierarchical level is output from the arithmetic operation device 174 and supplied to a variable length code encoder 178. Output data of the variable length code encoder 178 is obtained as data in the second hierarchical level from an output terminal 183.

Output data d13 of the dequantizing device 165 is supplied to a class categorizing adaptive predicting circuit 169. The class categorizing adaptive predicting circuit 169 performs the predicting process for the data d13 and generates a predicted value d9 of data in the first hierarchical level. The predicted value d9 is supplied to the subtraction device 156. The subtraction device 156 obtains the difference between the input pixel data d0 supplied from the input terminal 151 and the predicted value d9 and supplies a difference value d5 to a quantizing device 160.

Output data of the quantizing device 160 is supplied to an arithmetic operation device 173. The arithmetic operation device 173 thins out one pixel from four pixels. Data d17 in the first hierarchical level is output from the arithmetic operation device 173 and supplied to a variable length code encoder 177. Output data of the variable length code encoder 177 is obtained as data in the first hierarchical level from an output terminal 182.

The class categorizing adaptive predicting circuits 169, 170, 171, and 172 categorize classes of pixels in lower hierarchical levels to be predicted corresponding to the level distribution of a plurality of spatially adjacent pixels (included in the higher hierarchical levels). A table for predicted coefficients corresponding to individual classes or predicted values that have been learnt is stored in memory. A plurality of predicted coefficients for individual classes or one predicted value is read from the memory. The predicted value is used as it is. Predicted coefficients and a plurality of pixels are linearly combined so as to generate a predicted value. Such a class categorizing adaptive predicting method has been disclosed in Japanese Patent Application No. HEI 4-155719 by the applicant of the present invention.

Figure 23:
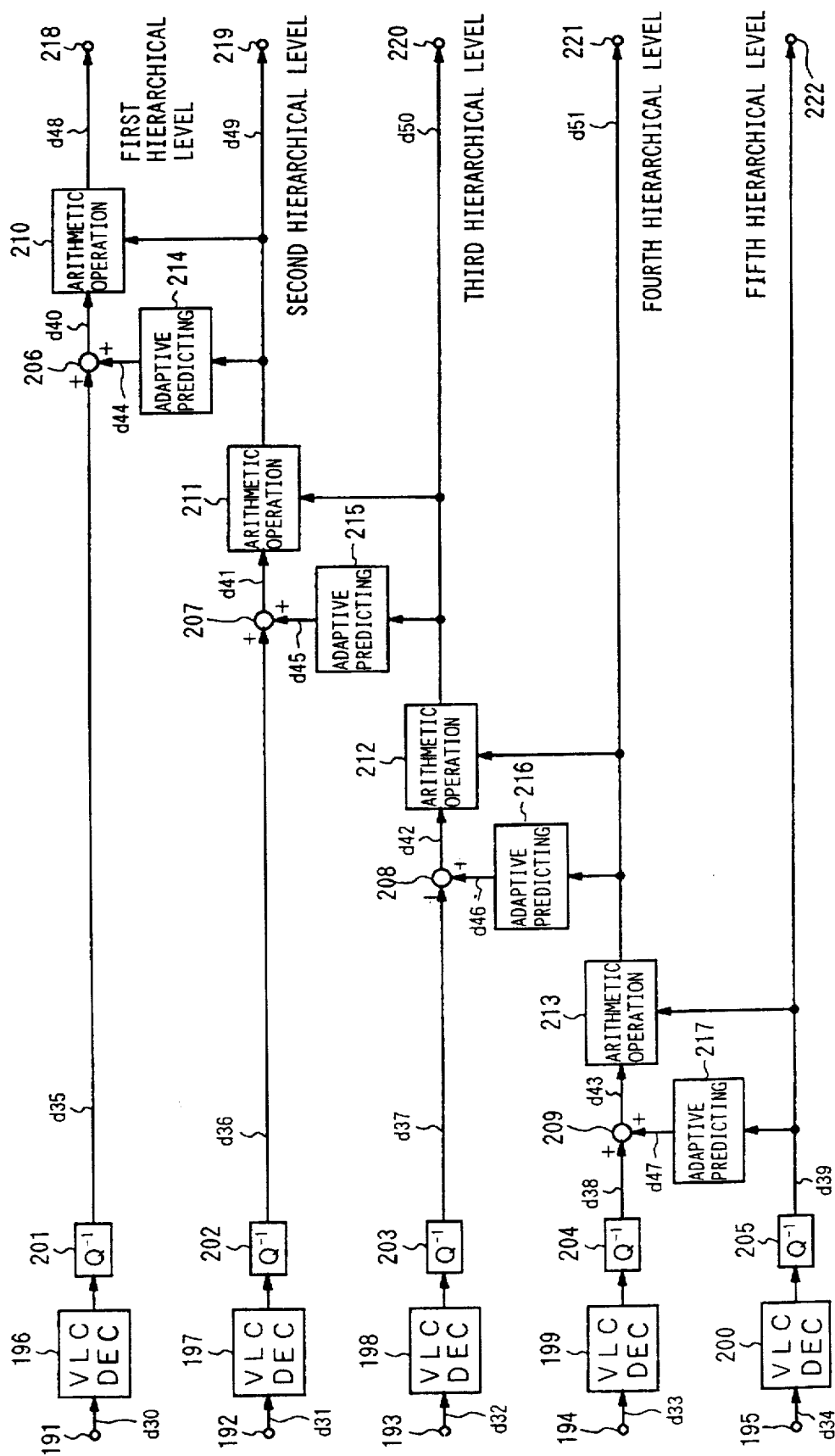
FIG. 23 is a block diagram showing an example of the construction of a decode side of the hierarchical encoding process.

FIG. 23 shows an example of the construction of a hierarchical code decoder corresponding to the encoder. Data in individual hierarchical levels generated by the encoder is input as d30 to d34 to terminals 191, 192, 193, 194, and 195. Variable length code decoders 196, 197, 198, 199, and 200 decode respective variable length codes. The decoders are connected to dequantizing devices 201, 202, 203, 204, and 205, respectively.

The dequantizing device 205 performs the decoding process for the input data d34 in the fifth hierarchical level and generates picture data d39. The picture data d39 is supplied to a class categorizing adaptive predicting circuit 217 and an arithmetic operation device 213. In addition, the picture data d39 is obtained as picture output data in the fifth hierarchical level from an output terminal 222.

The class categorizing adaptive predicting circuit 217 performs the class categorizing adaptive predicting process for picture data in the fourth hierarchical level and generates a predicted value d47 of data in the fourth hierarchical level. An addition device 209 adds data d38 (namely, a difference value) supplied from the dequantizing device 204 and the predicted value d47 and supplies picture data d43 to the arithmetic operation device 213. The arithmetic operation device 213 performs the arithmetic operation of the formula (11). Thus, all pixel values in the fourth hierarchical level are restored from the picture data d39 supplied from the dequantizing device 205 and from the picture data d43. All the pixel values restored by the arithmetic operation device 213 are supplied as picture data d51 to a class categorizing adaptive predicting circuit 216 and an arithmetic operation device 212. In addition, the picture data d51 is output as output data in the fourth hierarchical level from an output terminal 221.

The class categorizing adaptive predicting circuit 216 performs the class categorizing adaptive predicting process for the picture data in the third hierarchical level in the same manner as described above and generates a predicted value d46 in the third hierarchical level. An addition device 208 adds data d37 supplied from the dequantizing device 203 and the predicted value d46. Picture data d42 of the addition device 208 is supplied to the arithmetic operation device 212. The arithmetic operation device 212 performs the arithmetic operation of the formula (10). Thus, all pixel values in the third hierarchical level are restored from the picture data d51 supplied from the arithmetic operation device 213 and from the picture data d42. All the restored pixel values are supplied as picture data d50 to a class categorizing adaptive predicting circuit 215 and an arithmetic operation device 211. In addition, the picture data d50 is obtained as output data in the third hierarchical level from an output terminal 220.

The class categorizing adaptive predicting circuit 215 performs the class categorizing adaptive predicting process for picture data in the second hierarchical level in the same manner as described above and generates a predicted value d45 of data in the second hierarchical level. An addition device 207 adds data d36 supplied from the dequantizing device 202 and the predicted value d45. Picture data d41 is output from the addition device 207 and supplied to the arithmetic operation device 211. The arithmetic operation device 211 performs the arithmetic operation of the formula (11). Thus, all pixel values in the second hierarchical level are restored from the picture data d50 supplied from the arithmetic operation device 212 and from the picture data d41. All the restored pixel values are supplied as picture data d49 to a class categorizing adaptive predicting circuit 214 and an arithmetic operation device 210. In addition, the picture data d49 is obtained as output data in the second hierarchical level from an output terminal 219.

The class categorizing adaptive predicting circuit 214 performs the class categorizing adaptive predicting process for picture data in the first hierarchical level in the same manner as described above and generates a predicted value d44 of data in the first hierarchical level. An addition device 206 adds data d35 supplied from the dequantizing device 201 and the predicted value d44. Picture data d40 is output from the addition device 206 and supplied to an arithmetic operation device 210. The arithmetic operation device 210 performs the arithmetic operation of the formula (11). Thus, all pixel values in the first hierarchical level are restored from the picture data d49 supplied from the arithmetic operation device 211 and the picture data d40. All the restored pixel values are supplied as picture data d48 from the arithmetic operation device 210 and obtained as output data in the first hierarchical level from an output terminal 218. In the hierarchical encoding method for preventing the number of pixels to be encoded from increasing, the encoding efficiency can be improved.

As a real application example of the above-described hierarchical encoding system, when a high-vision TV still picture database is constructed, data in the lowest hierarchical level, namely, data in the first hierarchical level (original picture), is reproduction data with a high-vision resolution. Data in the second hierarchical level is reproduction data with a standard resolution. Data in the highest hierarchical level, namely data in the fifth hierarchical level, is reproduction data with a low resolution for high speed data retrieval.

When a compression encoding process is used for reducing the information amount, reproduction picture data obtained by the decoding apparatus does not always accord with the input original picture data. However, the deterioration of the picture quality can be suppressed so that it cannot be visually detected. In addition, the average value may be obtained by a simple averaging method or a weighted averaging method.

The present invention can be applied for the quantizing process of the difference signal generated by other than the above-described prediction encoding process. In addition, the present invention can be applied for a system having a buffering construction for controlling a quantizing step width Δ so as to control the generated data amount.

According to the present invention, before a difference signal is quantized, it is for example block-segmented so as to narrow the level distribution range of the difference signal. Thus, the dynamic range of the quantizing process can be substantially widened. In addition, since the difference signal in the narrow distribution range is quantized, the accuracy of the quantizing process can be improved.

In addition, according to the present invention, the quantizing step width is optimized so that the quantizing process is performed corresponding to the input signal. Thus, the high efficient encoding process is performed with less picture quality deterioration. Consequently, the dequantized accuracy can be improved.

Figure 24:
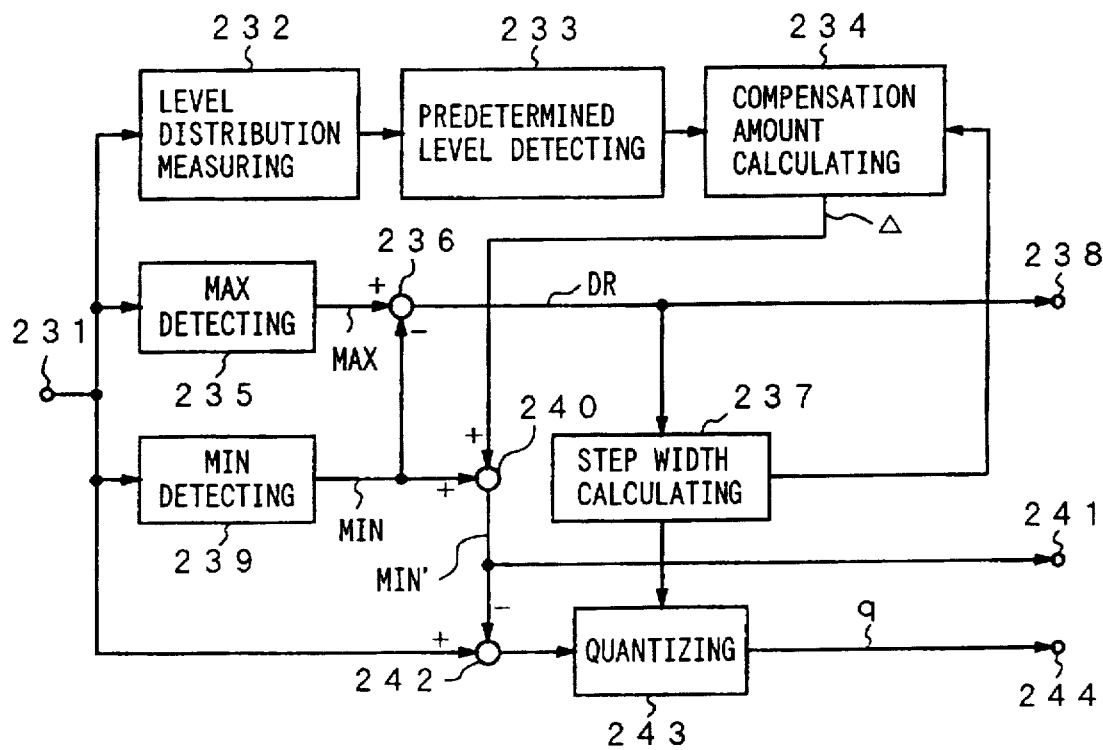
FIG. 24 is a block diagram showing a quantizing device according to an embodiment of the present invention.
Figure 26:
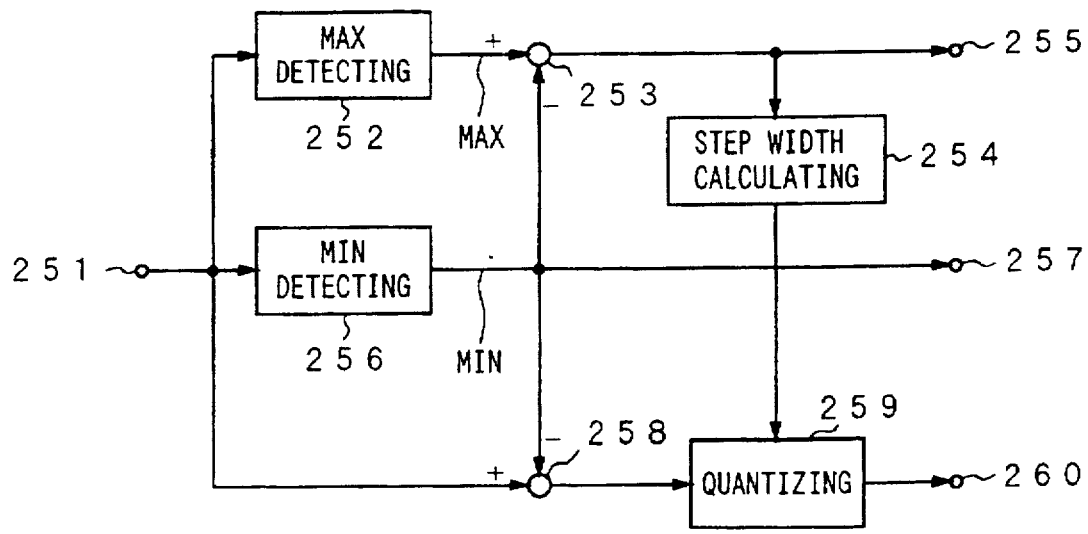
FIG. 26 is a block diagram showing an example of a conventional quantizing device.

Next, with reference to the accompanying drawings, a second embodiment of the present invention will be described. FIG. 24 is a block diagram showing a quantizing apparatus according to an embodiment of the present invention. Input data segmented into (8×8) blocks is supplied from an input terminal 231. The input data is supplied to a level distribution measuring circuit 232, a maximum value detecting circuit 235, a minimum value detecting circuit 239, and a subtraction device 242. The level distribution measuring circuit 232 counts the frequency of the levels of pixels of each block. The predetermined level detecting circuit 233 detects whether or not for example ¼ or more of 64 pixels of a (8×8) block concentrate to one level.

When ¼ or more of all pixels of the block concentrate to one level, this level is designated a predetermined level. The detected predetermined level is supplied to a compensation amount calculating circuit 234. The maximum value detecting circuit 235 receives the input data and detects the maximum value MAX of each block of the input data. The detected maximum value MAX is supplied to a subtraction device 236. The subtraction device 236 subtracts the minimum value MIN detected by the minimum value detecting circuit 239 from the maximum value MAX and generates a dynamic range DR. The dynamic range DR is supplied to a step width calculating circuit 237 and also obtained from an output terminal 238.

The step width calculating circuit 237 calculates a step width corresponding to the supplied dynamic range DR. The calculated step width is supplied to a quantizing circuit 243. A plurality of representative values corresponding to the calculated step widths are supplied from the step width calculating circuit 237 to the compensation amount calculating circuit 234. The compensation amount calculating circuit 234 compares the predetermined level supplied from the predetermined level detecting circuit 233 and the representative values supplied from the step width calculating circuit 237. A compensation amount Δ with the minimum error is supplied to an addition device 240. The added result is supplied as a minimum value MIN' to a subtraction device 242 and also obtained from an output terminal 241.

The subtraction device 242 normalizes the input data corresponding to the minimum value MIN'. The normalized input data is supplied to the quantizing circuit 243. The quantizing circuit 243 quantizes the input data corresponding to the supplied step width. A quantized value q is supplied from the quantizing circuit 243 to an output terminal 244. When ¼ or more of all pixels of the block does not concentrate to one level, the same process as the conventional ADRC is performed.

Figure 25A:
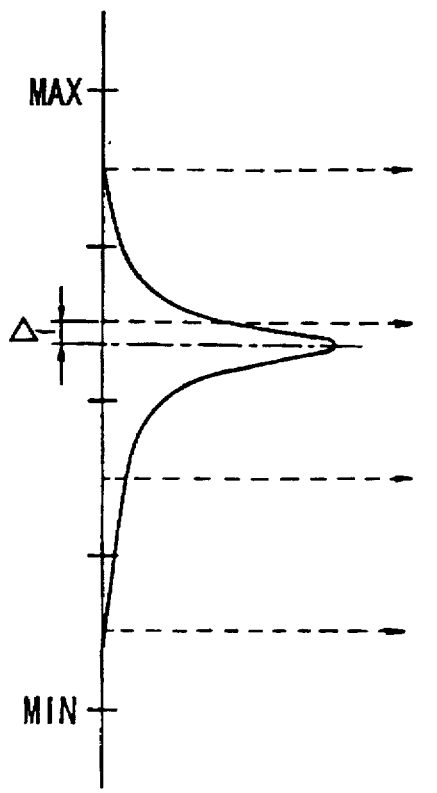
FIGS. 25A and 25B are schematic diagrams for explaining a predetermined level detecting circuit according to the present invention.

Next, with reference to FIGS. 25A and 25B, an example of the operation of the present invention will be described. As shown in FIG. 25A, the level distribution measuring circuit 232 measures the frequency of the levels of the pixels of each block of the input data. The predetermined level detecting circuit 233 detects the predetermined level of which ¼ or more of all pixels of the block concentrate to one level. The compensation amount calculating circuit 234 receives a plurality of representative values corresponding to the dynamic range DR from the step width calculating circuit 237. The compensation amount calculating circuit 234 obtains the absolute values of the differences of the representative values and the predetermined level. The minimum value of the absolute values of the differences is detected and the minimum difference is supplied as a compensation amount Δ to the addition device 240. The addition device 240 adds the detected minimum value MIN and the compensation amount Δ.

Figure 25B:
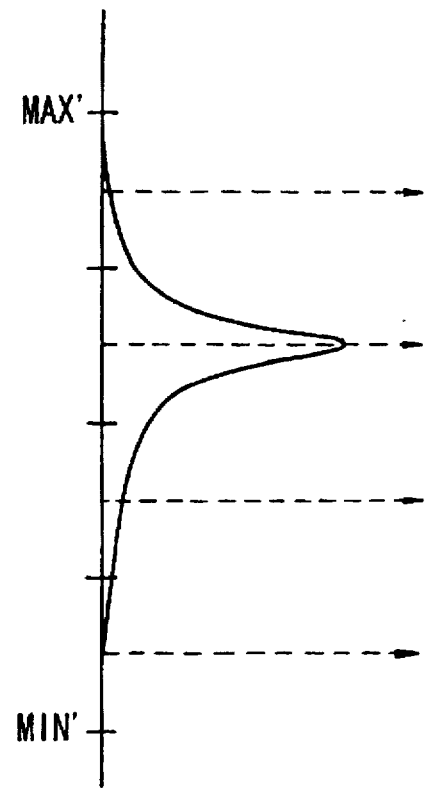

In other words, as shown in FIG. 25B, the minimum value MIN is shifted for the compensation amount Δ. On the other hand, since the dynamic range DR is not changed, the minimum value MIN and the maximum value MAX are shifted for the compensation amount Δ. As shown in FIG. 25B, the level distribution of the shifted data is changed so that the predetermined level in which ¼ or more of all pixels of the block concentrate accords with the representative value.

According to the embodiment, the dynamic range is not changed and the predetermined level accords with the representative value. Thus, the method for shifting both the minimum value MIN and the maximum value MAX for the compensation amount Δ is used. However, a method for compensating the minimum value MIN and/or the maximum value MAX and changing the dynamic range DR may be used so that the predetermined level accords with the representative value.

In the above-described embodiment, a two-dimensional block composed of eight pixels×eight lines is exemplified. However, the present invention can be applied for a three-dimensional block using pixels in temporal direction.

In addition, the present invention can be applied for a requantizing process for reducing the number of bits along with the ADRC.

According to the present invention, in a quantizing apparatus for picture signals, even if input data concentrates to a predetermined level, since the level is directly decoded, a spatial offset distortion can be removed.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A quantizing apparatus for quantizing a difference signal representing the difference between a sample value of an input digital signal and a predicted value, wherein said difference signal has a most concentrated distribution for a portion of said input digital signal different than the distribution for the entire input digital signal, said apparatus comprising:

means for obtaining a difference value between one of representative values of which the difference signal is quantized and said most concentrated distribution to be quantized;

means for shifting a quantizing representative value corresponding to the difference value so that the signal to be quantized accords with said most concentrated distribution of the signal to be quantized; and means for performing a quantizing operation corresponding to the shifted representative value.

2. The quantizing apparatus as set forth in claim 1, further comprising:

means for transmitting the difference signal as coded side information.

3. The quantizing apparatus as set forth in claim 2, further comprising:

means for transmitting, as a code corresponding to a representative value, the difference signal quantized as the coded side information.

4. The quantizing apparatus as set forth in claim 2, further comprising:

means for transmitting both a code corresponding to a representative value of the quantized difference signal and data defining a quantizing condition as the side information.

5. The quantizing apparatus as set forth in claim 4, further comprising:

means for transmitting data defining a quantizing step width as the quantizing condition.

6. The quantizing apparatus as set forth in claim 4, further comprising:

means for transmitting data defining a signal distribution width as the quantizing condition.

7. The quantizing apparatus as set forth in claim 1, further comprising:

means for selecting a quantizing step width corresponding to the distribution of the shifted represented value of the signal to be quantized.

8. The quantizing apparatus as set forth in claim 7, wherein the quantizing step width selected corresponding to the distribution of the signal to be quantized is optimized.

9. The quantizing apparatus as set forth in claim 7, wherein a quantizing step width is selected so that a restored error of the signal to be quantized becomes minimum, thereby determining an optimum value of the signal distribution width.

10. The quantizing apparatus as set forth in claim 7, wherein an evaluation range of the quantizing step width is limited corresponding to a feature amount of the signal to be quantized, thereby determining an optimum value of the signal distribution width.

11. The quantizing apparatus as set forth in claim 7, wherein an evaluation range of the quantizing step width is limited and the quantizing step width is determined so that an absolute restored value error of the signal to be quantized becomes minimum, thereby determining an optimum value of the quantizing step width.

12. A quantizing apparatus for quantizing a difference signal representing the difference between a sample value of an input digital signal and a predicted value, comprising:

means for obtaining a difference value between one of representative values of which the difference signal is quantized and a most concentrated value of a signal value to be quantized;

means for shifting a quantizing representative value corresponding to the difference value so that the signal to be quantized accords with a most concentrated value of the signal to be quantized; and means for performing a quantizing operation corresponding to the shifted representative value, wherein an output signal of said quantizing means is transmitted, and wherein both a code corresponding to a representative value of which the difference signal is quantized and data defining a quantizing condition are transmitted as side information so that a restored value of the reference value is not changed.

13. The quantizing apparatus as set forth in claim 12, wherein both a code corresponding to a representing value of which the difference signal is quantized and data defining a quantizing condition as side information are transmitted as side information, and wherein a quantizing region is shifted so that a restored value of the reference value is not changed.

14. The quantizing apparatus as set forth in claim 1 further comprising:

plane encoding means for dividing a quantized signal for each bit plane; and variable length encoding means for variable length encoding each of the bit planes.

15. The quantizing apparatus as set forth in claim 1, further comprising:

selecting means for selecting one of a plurality of quantizers which generates a shifted representative value that accords with a most concentrated value of the signal to be quantized.

16. A quantizing method for quantizing a difference signal representing the difference between a sample value of an input digital signal and a predicted value, wherein said difference signal has most concentrated distribution for a portion of said entire input digital signal different from said distribution for the entire input digital signal, said method comprising the steps of:

obtaining a difference value between one of representative values of which the difference signal is quantized and said most concentrated distribution to be quantized;

shifting a quantizing representative value corresponding to the difference value so that the signal to be quantized accords with said most concentrated distribution of the signal to be quantized; and performing a quantizing operation corresponding to the shifted representative value.

17. A quantizer, comprising:

level detecting means for forming a block composed of a plurality of spatially and/or temporally adjacent pixels and for detecting a particular level of which the pixels of the block are concentrated;

compensation amount generating means for generating a compensation amount corresponding to the detected particular level;

compensating means for compensating a reference value of the block with the compensation amount;

normalizing means for normalizing the pixels of the block corresponding to the reference value; and means for quantizing the normalized pixels.

18. The quantizer as set forth in claim 17, wherein said level detecting means comprises:

level distribution measuring means for measuring the frequency of the level of each of the pixels of the block; and means for detecting the particular level corresponding to the measured frequency.

19. The quantizing apparatus as set forth in claim 18, wherein ¼ or more of the pixels of the block include the measured frequency.

20. The quantizer as set forth in claim 17, wherein the reference value of the block is a maximum value or a minimum value of the block, and wherein the compensation amount is added to the maximum value and/or the minimum value of the reference value.

21. A method for quantizing pixel information, comprising the steps of:

forming a block composed of a plurality of spatially and/or temporally adjacent pixels and detecting a particular level of which the pixels of the block are concentrated;

generating a compensation amount corresponding to the detected particular level;

compensating a reference value of the block with the compensation amount;

normalizing the pixels of the block corresponding to the reference value; and quantizing the normalized pixels.

* * * * *